US010698230B2

(12) United States Patent
Du et al.

(10) Patent No.: US 10,698,230 B2
(45) Date of Patent: *Jun. 30, 2020

(54) LIGHT FIELD DISPLAY CONTROL METHOD AND APPARATUS, AND LIGHT FIELD DISPLAY DEVICE

(71) Applicant: Beijing Zhigu Rui Tuo Tech Co., Ltd., Beijing (CN)

(72) Inventors: Lin Du, Beijing (CN); Liang Zhou, Beijing (CN)

(73) Assignee: BEIJING ZHIGU RUI TUO TECH CO., LTD., Beijing (CN)

( * ) Notice: Subject to any disclaimer, the term of this patent is extended or adjusted under 35 U.S.C. 154(b) by 370 days.

This patent is subject to a terminal disclaimer.

(21) Appl. No.: 15/398,370

(22) Filed: Jan. 4, 2017

(65) Prior Publication Data

US 2017/0208317 A1     Jul. 20, 2017

(30) Foreign Application Priority Data

Jan. 18, 2016   (CN) .......................... 2016 1 0029157

(51) Int. Cl.
*H04N 9/47*         (2006.01)
*G02B 30/27*      (2020.01)
(Continued)

(52) U.S. Cl.
CPC ......... *G02B 30/27* (2020.01); *G02B 27/0075* (2013.01); *G02B 27/0093* (2013.01); *H04N 13/128* (2018.05); *H04N 13/307* (2018.05)

(58) Field of Classification Search
CPC .......... G06T 15/04; G06T 2207/10024; G06T 2207/10028; H04N 13/305; H04N 13/307;
(Continued)

(56) References Cited

U.S. PATENT DOCUMENTS

2007/0247708 A1   10/2007   De Zwart et al.
2014/0253760 A1    9/2014   Watanabe et al.
(Continued)

FOREIGN PATENT DOCUMENTS

CN   101040206 A    9/2007
CN   103353667 A   10/2013
(Continued)

*Primary Examiner* — Masum Billah
(74) *Attorney, Agent, or Firm* — Sheppard Mullin Richter & Hampton LLP

(57) ABSTRACT

Embodiments of the present application disclose a light field display control method and apparatus and a light field display device. The light field display control method comprises: determining at least one depth distribution sub-region of content according to a display depth of field (DoF) range of a light field display device and depth distribution information of the content, wherein each depth distribution sub-region of the at least one depth distribution sub-region is located outside the display DoF range; and tilting a first display unit at least with respect to an original plane of a display array of the light field display device according to the display DoF range of the light field display device and the depth distribution sub-region, wherein the first display unit is a display unit that is in the display array and affects display of a first object, and the first object is a part, which is located in the depth distribution sub-region, of the content. The present application can improve display quality of an object, which is located in a partial depth distribution sub-region, of content to be displayed or content being displayed.

30 Claims, 8 Drawing Sheets

(51) Int. Cl.
*G02B 27/00* (2006.01)
*H04N 13/128* (2018.01)
*H04N 13/307* (2018.01)

(58) Field of Classification Search
CPC .............. G02B 27/2214; G02B 3/0056; G02B 13/0085; G02B 2027/0134; G02B 2027/0178
USPC .......................................................... 348/59
See application file for complete search history.

(56) References Cited

U.S. PATENT DOCUMENTS

| | | | |
|---|---|---|---|
| 2014/0292620 A1* | 10/2014 | Lapstun | ................. G02B 26/10 345/6 |
| 2015/0248776 A1 | 9/2015 | Kasahara et al. | |
| 2016/0161769 A1 | 6/2016 | Du et al. | |

FOREIGN PATENT DOCUMENTS

| CN | 104038690 A | 9/2014 | |
|---|---|---|---|
| EP | 2913992 A3 | 10/2015 | |
| WO | WO-2015077718 A9 * | 6/2016 | ........... H04N 13/383 |

* cited by examiner

LIGHT FIELD DISPLAY CONTROL METHOD AND APPARATUS, AND LIGHT FIELD DISPLAY DEVICE

CROSS REFERENCE TO RELATED APPLICATION

The present application is based on and claims the benefit of priority to Chinese Application No. 201610029157.6, filed on Jan. 18, 2016, the entire contents of which are incorporated herein by reference.

TECHNICAL FIELD

The present application relates to the field of light field display technologies, and in particular, to a light field display control method and apparatus, and a light field display device.

BACKGROUND

A light field display technology was proposed early in the $20^{th}$ century, and two representative implementation manners of the light field display technology are: a lenslet array-based implementation manner proposed by Lippmann in 1908 and a parallax barriers-based implementation manner proposed by Ives in 1903. In recent years, as consumer electronics impose diversified requirements on display devices, the light field display technology is applied to different scenarios and devices, such as a 3D display array, a wearable device, and a light field display device for vision correction, and can implement relatively flexible display effects, such as light field 3D display, light field projection display, light field near-to-eye display on a wearable device, and vision correction by means of light field display.

At present, the computing power and resolution of electronic devices gradually match with a hardware resource requirement of the light field display technology, which provides desirable support for the promotion and application of the light field display technology, and also attracts more attention of insiders and encourages the insiders to carry out in-depth study.

SUMMARY

The following provides a brief summary about the present application, so as to provide basic comprehension about some aspects of the present application. It should be understood that, the summary is not an exhaustive summary of the present application. It is neither intended to determine the key part or important part of the present application nor intended to limit the scope of the present application. The objective thereof is merely to provide some concepts in a simplified form, to serve as a prelude for subsequent more detailed descriptions.

The present application provides a light field display control method and apparatus and a light field display device.

According to a first aspect, an embodiment of the present application provides a light field display control method, comprising:

determining at least one depth distribution sub-region of content according to a display depth of field (DoF) range of a light field display device and depth distribution information of the content, wherein each depth distribution sub-region of the at least one depth distribution sub-region is located outside the display DoF range; and tilting a first display unit at least with respect to an original plane of a display array of the light field display device according to the display DoF range of the light field display device and the depth distribution sub-region, wherein the first display unit is a display unit that is in the display array and affects display of a first object, and the first object is a part, which is located in the depth distribution sub-region, of the content.

According to a second aspect, an embodiment of the present application further provides a light field display control apparatus, comprising:

a depth distribution sub-region determining module, configured to determine at least one depth distribution sub-region of content according to a display DoF range of a light field display device and depth distribution information of the content, wherein each depth distribution sub-region of the at least one depth distribution sub-region is located outside the display DoF range; and a tilt control module, configured to tilt a first display unit at least with respect to an original plane of a display array of the light field display device according to the display DoF range of the light field display device and the depth distribution sub-region, wherein the first display unit is a display unit that is in the display array and affects display of a first object, and the first object is a part, which is located in the depth distribution sub-region, of the content.

According to a third aspect, an embodiment of the present application provides another light field display control apparatus, comprising:

a processor, a communications interface, a memory, and a communications bus, wherein the processor, the communications interface, and the memory communicate with each other by means of the communications bus;

the memory is configured to store at least one instruction, and the instruction causes the processor to perform the following operations:

determining at least one depth distribution sub-region of content according to a display DoF range of a light field display device and depth distribution information of the content, wherein each depth distribution sub-region of the at least one depth distribution sub-region is located outside the display DoF range; and tilting a first display unit at least with respect to an original plane of a display array of the light field display device according to the display DoF range of the light field display device and the depth distribution sub-region, wherein the first display unit is a display unit that is in the display array and affects display of a first object, and the first object is a part, which is located in the depth distribution sub-region, of the content.

According to a fourth aspect, an embodiment of the present application provides a light field display device, comprising:

a display array, comprising multiple display units that are distributed in the array and are capable of tilting with respect to an original plane of the display array;

a lenslet array, comprising multiple lenslets distributed in the array; and a light field display control apparatus according to any embodiment of the present application, wherein the light field display control apparatus is connected to the display array and the lenslet array.

In the technical solutions provided by the embodiments of the present application, the first display unit is tilted at least with respect to the original plane of the display array according to a current display DoF range of the light field display device and a depth distribution sub-region on which image quality control needs to be performed, to change a display image distance of the first object in space at least by means of control over the tilt of the first display unit, so that an average display image distance of a virtual image which is formed after the first object is displayed by the first lenslet is distributed in the current display DoF range of the light field display device as far as possible, thereby improving display quality of the first object displayed by the first display unit that at least has been tilted. In this solution, on the basis of clear imaging in an original display DoF range, a control means of at least tilting a display unit is fully utilized to improve display quality of an object in at least one depth distribution sub-region outside the display DoF range, achieving an effect equivalent to that a user can clearly see an object which is in a depth range larger than the original display DoF range; moreover, in the display quality adjustment process, it is unnecessary to perform complex computation on source content of a light field, and by adjusting a focal length of a corresponding lenslet, display quality of an object outside the original display DoF range can be adjusted. The solution is simple and easy to control. Besides, in the present application, on the basis of an existing display pixel resource of the light field display device, a technical means is provided to clearly display, in a partial depth distribution sub-region, an object which otherwise would not be clearly displayed in some cases limited by the display pixel resource. The solution is simple and easy to control.

Through the following detailed description of optional embodiments of the present application with reference to the accompanying drawings, these and other advantages of the present application will be clearer.

BRIEF DESCRIPTION OF THE DRAWINGS

The present application may be better comprehended with reference to the following description provided in combination with the accompanying drawings, wherein same or similar reference numerals are used in all the accompanying drawings to represent same or similar components. The accompanying drawings together with the following detailed description, which are incorporated in the specification and form a part of the specification, are used to further illustrate the optional embodiments of the present application and explain the principle and advantage of the present application. In the accompanying drawings.

Figure 1:
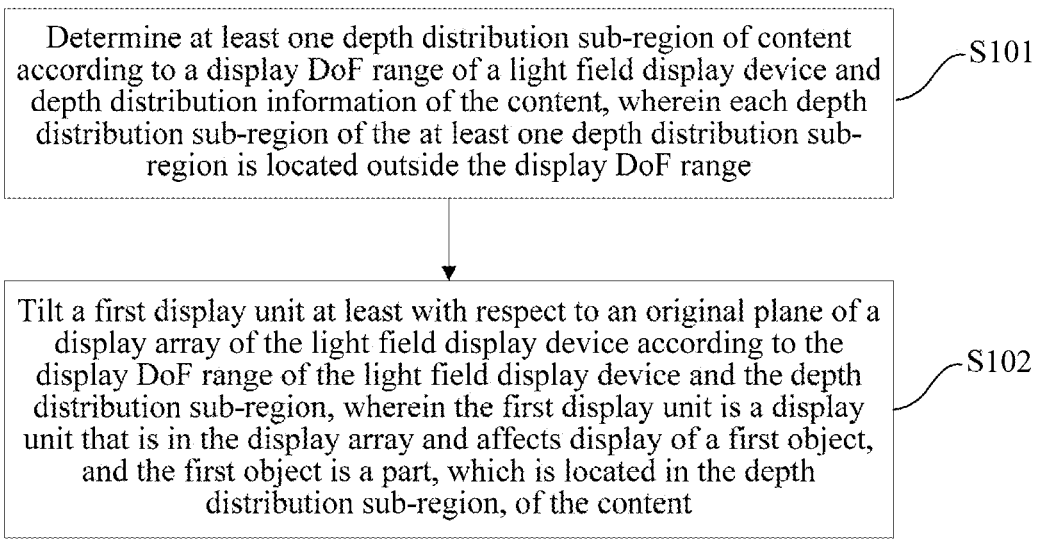
FIG. 1 is a flowchart of a light field display control method according to an embodiment of the present application.

A person skilled in the art should understand that, elements in the accompanying drawings are merely shown for the purpose of simplicity and clarity, but are not necessarily drawn proportionally. For example, sizes of some elements in the accompanying drawings may be enlarged relative to other elements, to help understand the embodiments of the present application.

DETAILED DESCRIPTION

Exemplary embodiments of the present application are described in detail in the following through the accompanying drawings. For clarity and simplicity, not all features of actual implementation manners are described in the specification. However, it should be understood that in a process of developing any such actual embodiment, many decisions specific to the implementation manner need to be made to implement specific objectives of developers, for example, meeting restrictive conditions related to a system and service, and the restrictive conditions may vary according to different implementation manners. Moreover, it should be further understood that, although the development work may be very complex and time consuming, the development work is merely a routine task for a person skilled in the art who is benefited from the content of the present disclosure.

Here, it should be further noted that, to prevent the present application from being blurred by unnecessary details, merely apparatus structures and/or processing steps closely related to the solutions of the present application are described in the accompanying drawings and the specification, and expressions and descriptions about components and processing that are less related to the present application and known by a person of ordinary skill in the art are omitted.

Specific implementation manners of the present application are further described in detail with reference to the accompanying drawings (same reference numerals in several accompanying drawings represent same elements) and embodiments. The following embodiments are used to describe the present application, but are not intended to limit the scope of the present application.

A person skilled in the art should understand that terms such as "first" and "second" in the present application are merely used to distinguish different steps, devices, modules or the like, and the terms neither represent any specific technical meanings nor indicate necessary logic orders between them.

FIG. 1 is a flowchart of a light field display control method according to an embodiment of the present application. The light field display control method provided in an embodiment of the present application may be executed by a light field display control apparatus, and the light field display control apparatus may execute the light field display control method in application programs that comprise but not limited to: image presentation, video playback, and the like, to perform image display control. A device manifestation form of the light field display control apparatus is not limited. For example, the light field display control apparatus may be an independent component, and the component is in coordination and communication with a light field display device; or the light field display control apparatus may be integrated in a light field display device as a functional module, and the light field display device may comprise but not limited to: an electronic device having a light field display capability. For example, the light field display device may comprise but not limited to: a near-to-eye light field display device, and the near-to-eye light field display device may comprise but not limited to: a smart helmet, smart glasses, and the like. Specifically, as shown in FIG. 1, a light field display control method provided in an embodiment of the present application comprises:

S101: Determine at least one depth distribution sub-region of content according to a display DoF range of a light field display device and depth distribution information of the content, wherein each depth distribution sub-region of the at least one depth distribution sub-region is located outside the display DoF range.

Figure 2A:
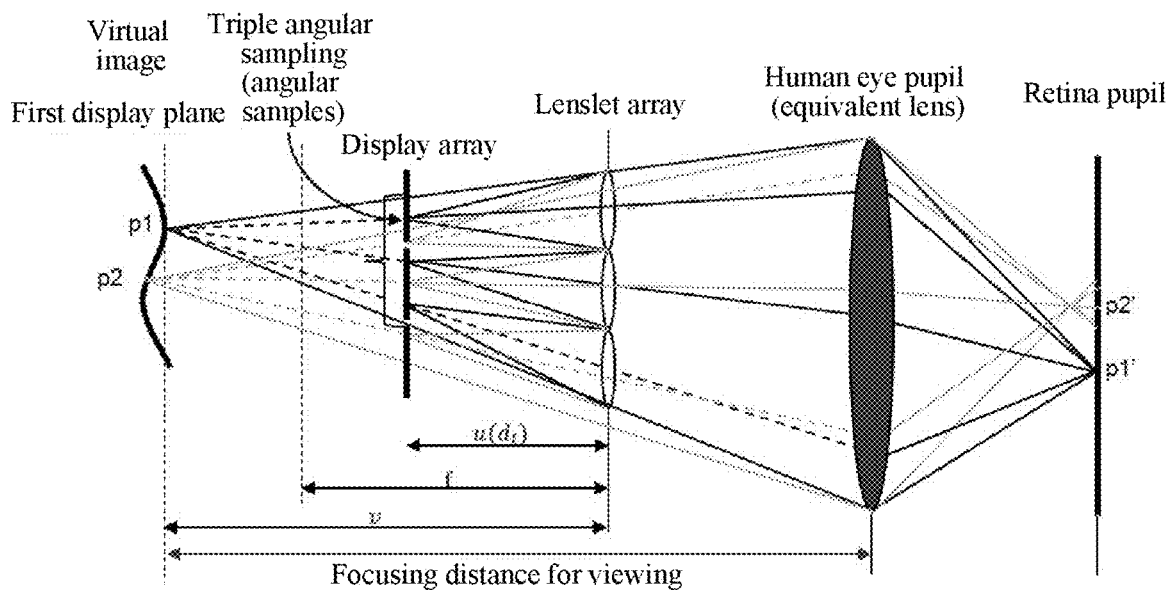
FIG. 2a illustrates a first example of a light field display device and light field display thereof according to an embodiment of the present application.

The light field display device comprises a display array and a lenslet array that are arranged close to each other, as shown in FIG. 2a. The display array may be a display formed by multiple connected display units that are distributed in the array, wherein each display unit comprises multiple display pixels distributed in an array, each display unit can display a sub-image, and the sub-image is a part of an image of the content. The lenslet array may also be referred to as a micro-lens array, and comprises multiple lenslets (or referred to as micro lenses) distributed in an array. A propagation direction of a light ray from the display array is changed by at least one lenslet in the lenslet array, and the light ray with the changed propagation direction forms an image on a retina of a user after passing through an eye of the user (similar to a lens). If a partial image formed on the retina is a relatively small average circle of confusion, it is equivalent to that the user can see a clear virtual image which is displayed in space and corresponds to the partial image. On the contrary, if a partial image formed on the retina has a relatively large average circle of confusion, it is equivalent to that the user sees a vague virtual image which is displayed in space and corresponds to the partial image. In addition, because the display array and the lenslet array are arranged close to each other (wherein it should be noted that, a relative distance between components in the figure merely provides an exemplary illustration, and does not represent an actual distance between the components), the light ray whose propagation direction has been changed by the at least one lenslet forms a virtual image on a side, which is away from the user, of the display array. This virtual image corresponds to the image formed on the retina of the user, and is equivalent to an image seen by a human eye through the lenslet array; the virtual image may present a certain depth distribution in space, and the distribution of a circle of confusion of the virtual image in a current first display plane of the light field display device corresponds to the distribution of a circle of confusion of the image formed on the retina. For example, if some part of the virtual image has a relatively large average circle of confusion in the first display plane, an image of this part formed on the retina also has a relatively large average circle of confusion, and vice versa.

In a light field display process, the content displayed by the light field display device has a display DoF range in space, wherein the display DoF range is a range that has a particular depth width in a depth direction, and the range comprises a depth position of the first display plane; the first display plane is a display plane that is corresponding to a focusing distance for viewing in the depth direction and perpendicular to the depth direction. The focusing distance for viewing may be a default human eye focusing distance (for example, it is considered by default that an optimal distance for viewing a virtual image formed in the first display plane is 25 cm, and at this viewing distance, a human eye can clearly see the virtual image formed in the first display plane; in other words, a clearly image of the content displayed by the first display plane can be formed on the retina of the human eye located at the focusing distance for viewing). Alternatively, the focusing distance for viewing may be an actual human eye focusing distance, or the like. In an actual application, after a suitable focusing distance for viewing is determined, the first display plane corresponding to the focusing distance for viewing can be determined. A near-to-eye light field display device is used as an example for description. When the near-to-eye light field display device is used (for example, wearing smart glasses having a light field display capability) to watch the displayed content, a distance L between the human eye and the near-to-eye light field display device is relatively fixed. A difference value between the focusing distance for viewing and the distance L is calculated, and a depth position corresponding to the difference value is determined in the depth direction, wherein this depth position is the depth position of the first display plane. After the first display plane is determined, the display DoF range of the light field display device may be determined. For example, a permissible circle of confusion may be determined according to one or more parameters of a display quality expectation, a human eye characteristic, and the like; average imaging circles of confusion at different distances from the first display plane in the depth direction are calculated; and a continuous depth range, which comprises the depth position of the first display plane and of which an average imaging circle of confusion is less than the permissible circle of confusion, is determined as the display DoF range. Further, the display DoF range may be optimized with reference to the visual sensitivity of a human eye to the clearness of content displayed at different depths. For example, the human eye is more visually sensitive to the clearness of content displayed at a near place than to the clearness of content displayed at a further place. Therefore, with reference to the depth position of the first display plane, a permissible circle of confusion at a depth position close to the depth position of the first display plane may be determined as a lower permissible circle of confusion threshold (C1), and a permissible circle of confusion at a depth position away from the depth position of the first display plane may be determined as an upper permissible circle of confusion threshold (C2), thereby determining the display DoF range. The determined display DoF range is expressed as a particular depth range that comprises the depth position of the first display plane and that is asymmetrically distributed along the depth position of the first display plane. Certainly, the foregoing method for determining the first display plane and the display DoF range is merely an illustrative description, and a person skilled in the art can also use other determining methods, which are not limited in the embodiments of the present application. A virtual image displayed in the display DoF range is very clearly for a human eye at the focusing distance for viewing corresponding to the first display plane, while a virtual image displayed outside the display DoF range is very vague for a for a human eye at the focusing distance for viewing corresponding to the first display plane.

The content is content being displayed or content to be displayed. The depth distribution information of the content means distribution information of each part of the content in a depth direction when the content is in a displayed state. At least one depth distribution sub-region may be determined according to the depth distribution information of the content, and used as a depth distribution sub-region on which display quality control needs to be performed, wherein each depth distribution sub-region in the at least one depth distribution sub-region is located outside the display DoF range of the optical display device.

S102: Tilt a first display unit at least with respect to an original plane of a display array of the light field display device according to the display DoF range of the light field display device and the depth distribution sub-region, wherein the first display unit is a display unit that is in the display array and affects display of a first object, and the first object is a part, which is located in the depth distribution sub-region, of the content.

During implementation of the embodiments of the present application, the inventor of the present application finds that, if the clearness of different parts of the content needs to be adjusted, the current first display plane of the light field display device may be adjusted, and after the first display plane is changed, it is equivalent to that the display DoF range of the light field display device is re-determined. A part clearly displayed by the light field display device can be adjusted based on the depth distribution information of the displayed content and the re-determined display DoF range. For example, content that is clearly displayed by the light field display device currently is a foreground part having a relatively small depth, and by adjusting the first display plane, the content clearly displayed content can be changed to be a background part having a relatively large depth, or the like. To re-determine the first display plane, source content displayed by the light field display device needs to be processed. This requires a large amount of computation, the computation is highly complex, and the display speed is low. Therefore, the present application provides a new solution. In addition, the light field display technology achieves the rich and flexible display effect at the cost of spatial clearness, wherein multiple display pixels are required to display one object. Although the flexible display effect, that is, an adjustable first display plane, can be achieved based on a current display pixel resource of the light field display technology, it is still possible that some partial depth sub-regions in the depth direction cannot be clearly displayed in some cases even if all first display planes and the display DoF ranges thereof are stitched in the depth direction. In other words, a human eye always fails to see objects in these partial depth sub-regions clearly.

To implement light field display by using a display array not only achieves advantages such as improving the number of overall display pixels, that is, the clearness, and reducing costs, but also implements a more flexible display capability by means of tilting control. More specifically, the inventor notices that by tilting a display element, a display image distance of a first object can be changed, wherein the display element may comprise but not limited to: a display unit and/or a lenslet. Therefore, in the technical solution provided by the embodiments of the present application, this display image distance adjustment means is fully utilized: a first display unit is tilted at least with respect to an original plane of the display array (wherein the original plane is a plane in which the display array is located when all display units of the display array are in a non-tilted state) according to a current display DoF range of the light field display device and a depth distribution sub-region on which image quality control needs to be performed, to change a display image distance of the first object in space at least by means of control over the tilt of the first display unit, so that an average display image distance of a virtual image which is formed after the first object is displayed by the first lenslet is distributed in the current display DoF range of the light field display device as far as possible, thereby improving display quality of the first object displayed by the first display unit that at least has been tilted. A near-to-eye light field display is used as an example for description. Assuming that a distance between the first display plane and a human eye is 25 cm (that is, the focusing distance for viewing is 25 cm), an image formed in a particular depth range of the first display plane (that is, the display DoF range), for example, the depth range of [25 cm−5 cm, 25 cm+7 cm], is clear to the human eye, and if a user wants to see an image outside the display DoF range, for example, if the user wants to clearly see an image in a range of [32 cm, 35 cm] from the human eye (that is, in a particular depth distribution sub-region outside the display DoF range), a corresponding display unit may be tilted at least with respect to the original plane of the display array, so that images of a same object are displayed in the display DoF range, thereby improving the display clearness of the object, to allow the user to see the object clearly. In this solution, on the basis of clear imaging in an original display DoF range, a control means of at least tilting a display unit is fully utilized to improve display quality of an object in at least one depth distribution sub-region outside the display DoF range, achieving an effect equivalent to that a user can clearly see an object which is in a depth range larger than the original display DoF range; moreover, in the display quality adjustment process, it is unnecessary to perform complex computation on source content of a light field, and by adjusting a focal length of a corresponding lenslet, display quality of an object outside the original display DoF range can be adjusted. The solution is simple and easy to control. Besides, in the present application, on the basis of an existing display pixel resource of the light field display device, a technical means is provided to clearly display, in a partial depth distribution sub-region, an object which otherwise would not be clearly displayed in some cases limited by the display pixel resource. The solution is simple and easy to control.

The first display unit is a display unit that affects display of the first object, and the first lenslet is a lenslet that is in the lenslet array of the light field display device and affects display of the first object. In other words, the first display unit displays a sub-image corresponding to the first object, and a display light ray emitted by the first display unit can be displayed in space as a virtual image of a particular depth distribution after the first lenslet corresponding to the first display unit acts on the display light ray. Display of the first object may be affected by one or more display units (or lenslets). Therefore, in an actual application, there may be one or more first display units, and correspondingly, there may be one or more first lenslets. The tilt of the one or more first display units (and/or first lenslets) may be controlled, so as to improve the clearness of the displayed first object and improve display quality.

When the first object is displayed by using, for example, the light field display device, affected by factors such as the property of an optical wave and an aberration, imaging light rays of points on the object usually cannot be converged at one point, but form a diffusion projection in a shape of a circle or an ellipse or in another circle-like shape, that is, a circle of confusion, which is also known as disk of confusion, circle of indistinctness, blur circle, or blur spot. The size of a circle of confusion for imaging of a point may be calculated according to the following formula:

$$c_a = \frac{|d_a - d_0|}{d_a} E \qquad (1)$$

In the formula above: E represents a size of a human eye pupil, for example, a diameter of a human eye pupil; $d_a$ represents a focusing distance for viewing, that is, a distance between a current first display plane of a light field display device and the human eye pupil; $d_0$ represents a display depth of an object, for example, an average distance, in a depth direction, between a virtual image of the object and a human eye located at the focusing distance for viewing; $c_a$ represents a size of a circle of confusion (for example, a diameter of a circle of confusion) generated during imaging, at the human eye, of an image point having a display depth of $d_0$.

Figure 2B:
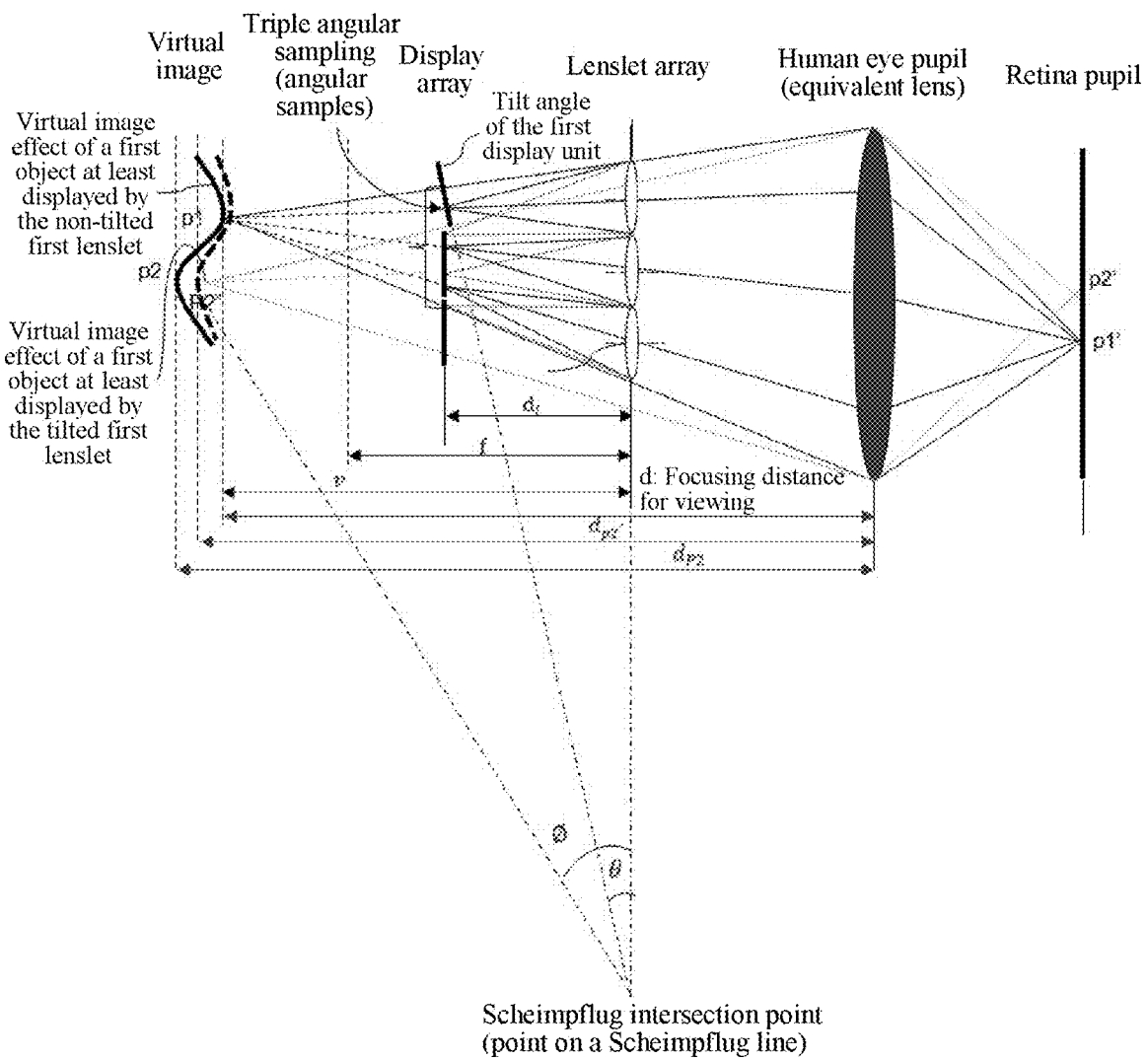
FIG. 2b illustrates a second example of a light field display device and light field display thereof according to an embodiment of the present application.

A circle of confusion distribution, which is in the first display plane of the light field display device, of a virtual image that is formed in space after the first object is displayed by a tilted optical element (wherein the optical element comprises at least the first display unit, for example, the optical element comprises the first display unit, or the optical element comprises the first display unit, the first lenslet, and the like) corresponds to a circle of confusion distribution, which is on the retina, of an image that is formed on the retina after the virtual image undergoes an equivalent lens effect of the human eye. Usually, if a circle of confusion has a relatively small size, an image of an object corresponding to the circle of confusion is relatively clear, and can be regarded as an in-focus image of the point with respect to the human eye, wherein the image is clear; correspondingly, if a size of a circle of confusion exceeds a particular permissible range, an image of an object corresponding to the circle of confusion is relatively blur. In the embodiments of the present application, the tilt of an optical element is controlled, and a convergence condition for tilt control of the optical element is as follows: an average circle of confusion of an image, which is formed on the first display plane of the light field display device or on the retina after a corresponding object is displayed by the tilted optical element, is less than or equal to a permissible circle of confusion. In other words, by means of control over the tilt of the optical element, an average circle of confusion of images, which are formed on the first display plane of the light field display device or on the retina by points of the first object displayed by the tilted optical element, is less than or equal to a permissible circle of confusion. As shown in FIG. 2b, an average circle of confusion of a retina image, which corresponds to a virtual image of the first object displayed by the tilted optical element, is reduced, and therefore average clearness of points in the first object is improved. It should be noted that, the term "points in the first object" expresses a relative concept, for example, a part displayed by an individual display pixel in the display array may be used as a point in the first object, which is not limited in the embodiments of the present application.

In any technical solution provided in the embodiments of the present application, the determining manner and the number of the depth distribution sub-regions may be determined according to an actual requirement, and the implementation manner is very flexible. For example, at least a partial depth region of the content outside the display DoF range may be determined as the at least one depth distribution sub-region according to input information of a user; for another example, at least a partial depth region of the content outside the display DoF range may be determined as the at least one depth distribution sub-region according to an image analysis result of the display DoF range and the content; and so on. It can be understood that, the determined at least partial depth region, as a whole, may be used as the depth distribution sub-region, or the determined at least partial depth region may be divided into multiple depth distribution sub-regions according to a particular condition, and so on. The foregoing specific implementation manner is not limited in the embodiment of the present application, so that diversified actual application requirements can be better satisfied.

A depth range of the depth distribution sub-region and the number of depth distribution sub-regions may be flexibly determined in other depth ranges, which are outside the display DoF range, of the content, to satisfy diversified application requirements.

Figure 3A:
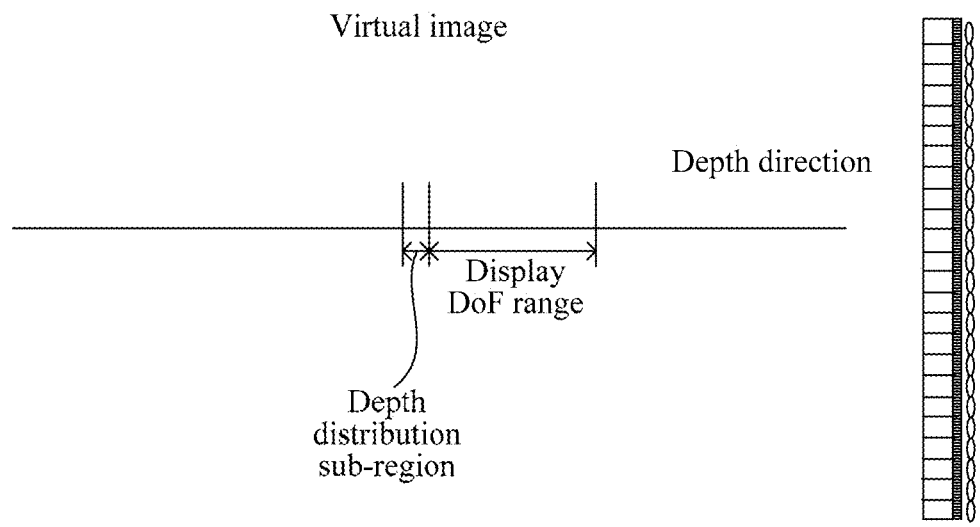
FIG. 3a illustrates a continuous depth distribution example of a depth distribution relationship between a depth distribution sub-region and a DoF range according to an embodiment of the present application.
Figure 3B:
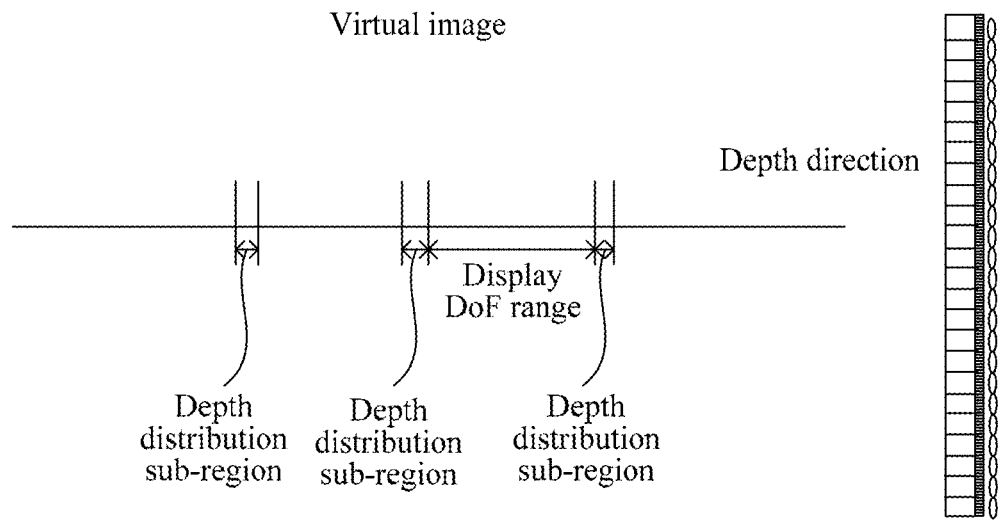
FIG. 3b illustrates a discontinuous depth distribution example of a depth distribution relationship between a depth distribution sub-region and a DoF range according to an embodiment of the present application.

Optionally, at least one of the at least one depth distribution sub-region is continuous in terms of depth with the display DoF range. In other words, one edge of at least one depth distribution sub-region in the at least one depth distribution sub-region is adjacent to one edge of the display DoF range in the depth direction, as shown in FIG. 3a or FIG. 3b. This solution helps improve display quality of an object, which is on the periphery of the display DoF range, in the content being displayed or the content to be displayed. In terms of a viewing effect of the user, this is equivalent to that the user can clearly see an object in a depth range larger than the original display DoF range.

Figure 3C:
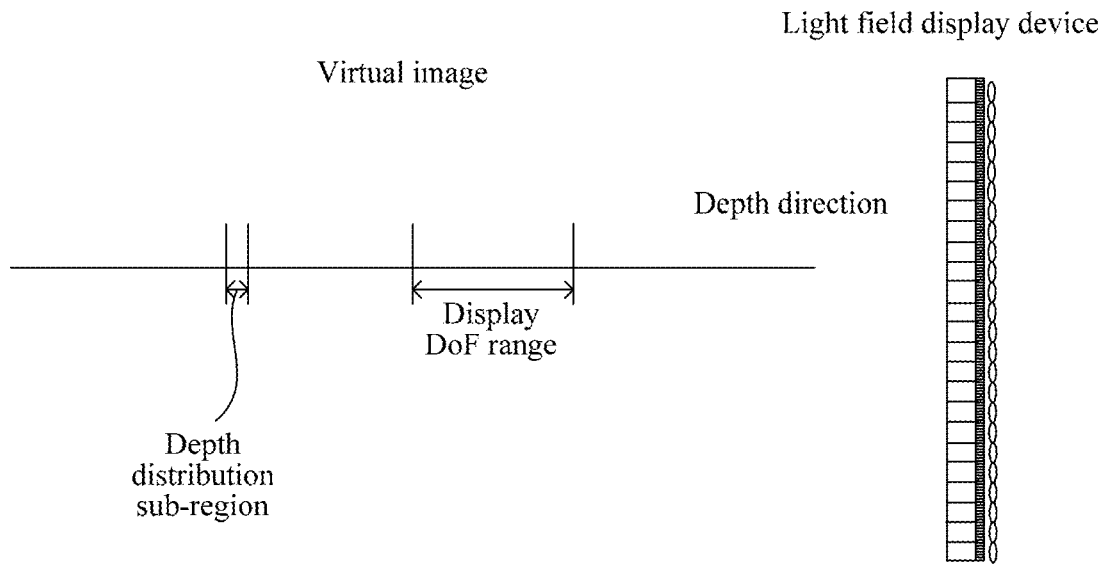
FIG. 3c illustrates a continuous depth distribution example and a discontinuous depth distribution example of a depth distribution relationship between depth distribution sub-regions and a DoF range according to an embodiment of the present application.

Optionally, at least one of the at least one depth distribution sub-region is discontinuous in terms of depth with the display DoF range. In other words, none of edges of at least one depth distribution sub-region in the at least one depth distribution sub-region is adjacent to any edge of the display DoF range in the depth direction, as shown in FIG. 3b or FIG. 3c. This solution helps improve display quality of an object, which is outside the display DoF range, in the content being displayed or the content to be displayed. In terms of a viewing effect of the user, this is equivalent to that the user can clearly see an object in a depth range larger than the original display DoF range.

After the depth distribution sub-region is determined, the first display unit may be tilted at least with respect to the original plane of the display array of the light field display device according to at least the display DoF range of the light field display device and the depth distribution sub-region. A specific implementation manner of tilt control is very flexible.

(I) In an optional implementation manner, the first display unit may be tilted with respect to the original plane of the display array according to the display DoF range and the depth distribution sub-region, so as to adjust a display image distance of the first object displayed by the first display unit, thereby improving the display quality of the first object.

Optionally, the tilting the first display unit with respect to the original plane of the display array according to the display DoF range and the depth distribution sub-region comprises: determining expected display depth information of the first object according to the display DoF range and the depth distribution sub-region; determining an expected tilt angle of the first display unit according to at least a focal length of the first lenslet and the expected display depth information; and tilting the first display unit with respect to the original plane of the display array according to at least the expected tilt angle.

After the first display unit is tilted with respect to the original plane of the display array, as shown in FIG. 2b, the plane in which the first display array is located is no longer parallel to the plane in which the lenslet array is located. With reference to the Scheimpflug principle, when an extended plane of a plane where an image, which is formed by means of the first display unit and the first lenslet corresponding to the first display unit, of the first object in the depth distribution sub-region is located (the plane is referred to as an object display plane below), an extended plane of a plane in which the tilted first display unit is located, and an extended plane of a plane in which the first lenslet is located (when the first lenslet is in a non-tilted state, a plane in which the first lenslet is located is the original plane of the lenslet array) intersect at a straight line (which may be referred to as a Scheimpflug line), the first object in the depth distribution sub-region can obtain a maximum clear imaging area and a minimum average circle of confusion; a tilt angle of the first lenslet satisfying the Scheimpflug principle is the expected tilt angle in the embodiment of the present application.

The object display plane may be obtained by means of fitting according to an expected distribution, in the display DoF range, of each image point in the depth distribution sub-region (namely, expected display depth information of the first object). For example, an optional implementation manner is:

(a1) Assuming that the content is a clear 2D image (wherein after light field display, the 2D image is displayed as a 3D image having a particular display depth distribution in space), an image coordinate set $\{(x_i, y_i)\}$ that comprises respective coordinates, in the 2D image, of points in the first object in a partial depth distribution sub-region of the 2D image may be determined according to depth distribution information of the 2D image.

(b1) According to the determined image coordinate set of the points, a first space coordinate set of respective virtual image points corresponding to the points is determined, and first space coordinates of any image point may be expressed as $p(x'_i, y'_i, d'_i)$, wherein $x'_i = M_1 x_i$, $y'_i = M_2 y_i$, M is a known scaling coefficient, for example, M1 is a known X-direction scaling coefficient and M2 is a known Y-direction scaling coefficient, and represents an image distance of the image point, that is, an image distance before the image point is mapped.

(c1) According to the determined first space coordinate set and the current display DoF range of the light field display device, coordinates of each point in the first space coordinate set are mapped into a particular depth sub-range of the display DoF range respectively, thereby obtaining a second space coordinate set, and second space coordinates of any image point may be expressed as $p'(x''_i, y''_i, d''_i)$, wherein: $x''_i$ represents a horizontal coordinate of the image point in the first display plane; $y''_i$ represents a vertical coordinate of the image point in the first display plane; and $d''_i$ represents an image distance of the image point after mapping. The mapping may be performed according to a particular rule. For example, on the premise of maintaining a relative depth relationship of image points in the depth distribution sub-region, the image points are mapped to a particular depth sub-range in the display DoF range. In other words, before adjustment, if a relative depth relationship between any two image points: image point $p_1$ and image point $p_2$, is that image distances of the two image points satisfy that $d_{p2} \geq d_{p1}$, then the image distances of the two image points after the adjustment satisfy that $d_{p2}' \geq d_{p1}'$. What is changed before and after the adjustment is a difference value between image distances. For example, a difference $(d_{p2}' - d_{p1}')$ between the image distances of the two image points before the adjustment is greater than a difference $(d_{p2}' - d_{p1}')$ between the image distances of the two image points after the adjustment, that is, $(d_{p2} - d_{p1}) \geq (d_{p2}' - d_{p1}')$. This is equivalent to a certain degree of depth compression on the first object in the depth distribution sub-region, so as to improve display quality of more parts of the first object. Optionally, proportional mapping may be performed on the premise of keeping the relative depth relationship of image points unchanged. For example, if four image points whose image distances are (25, 28, 42, 45) respectively need to be mapped into a display depth sub-region [30, 40], image distances of the image points after the mapping are {25+(30−25)*25/25, (28+30−25)*25/28, (42−5)*45/42, (45−5)*45/45} respectively, and in this way, the relative depth relationship of the image points is kept unchanged before and after the mapping.

(d1) A plane is obtained by means of fitting according to the second space coordinate set. This step is equivalent to providing a point cloud and obtaining a plane by means of fitting according to the point cloud, to make a sum of distances from points in the point cloud to the plane minimum. Further, during the fitting process, it can be ensured that the minimum distance sum is less than a preset value; otherwise, multiple planes may be obtained by means of fitting until a minimum distance sum is less than the preset value. An algorithm used in plane fitting belongs to the prior art. For example, a Random Sample Consensus (RANSC) is used, but the algorithm is not limited thereto, and details are not described herein.

Further optionally, the expected tilt angle of the first display unit may be calculated according to the following formula:

$$\tan\emptyset = \frac{u-f}{f}\tan\theta \qquad (3)$$

In the foregoing formula: $\theta$ represents an expected tilt angle of the first display unit; f represents a focal length of the first lenslet, $\emptyset$ represents an angle between the object imaging plane and the original plane of the display array, u represents a distance from an optical center of the first lenslet to a center of the first display unit along a direction perpendicular to the original plane of the display array, that is, a distance $d_l$ from the original plane of the lenslet array to the original plane of the display array, as shown in the figure. The first display unit is tilted with respect to the original plane of the display array according to at least the expected tilt angle determined in this solution, so that a tilt angle of the first display unit with respect to the original plane of the display array is close to the expected tilt angle as much as possible or even equal to the expected tilt angle, and moreover, when the first display unit in a tilted state displays an image, an image, which is formed on the first display plane or the retina of the user, of the first object in the depth distribution sub-region has an average circle of confusion as small as possible. This solution improves tilt control efficiency of the first display unit, and the first object displayed by the tilted first display unit can obtain a relatively large clear imaging area.

In an actual application, the tilt of the first display unit with respect to the original plane of the display array may be controlled according to the expected tilt angle, so that the tilt angle of the first display unit with respect to the original plane of the display array is close to the expected tilt angle as much as possible or even equal to the expected tilt angle.

Alternatively, a tilt direction of the first display unit may also be determined according to a relative distribution of the depth distribution sub-region and the display DoF range in the depth direction, and the first display unit is tilted with respect to the original plane of the display array according to the tilt direction and the expected tilt angle. By means of this solution, tilt control efficiency of the first display unit can be improved, so that tilt control on the first display unit satisfies a convergence condition of the average circle of confusion as quickly as possible. Specifically speaking, the tilted first display unit can change the display image distance of the first object, and if an actual image distance of the first object needs to be adjusted so that it falls in the display DoF range of the light field display device, the tilt direction of the first display unit may be determined according to the relative distribution of the depth distribution sub-region and the display DoF range in the depth direction, to improve the tilt control efficiency of the first display unit. For example, as shown in FIG. 2b, if the depth distribution sub-region of the first object is located at a relatively deep position with respect to the display DoF range (for example, an image distance $d_{p2}$ of an image point $p_2$ obtained after a point is displayed by the non-tilted first display unit and the first lenslet corresponding to the first display unit is located at a relatively deep position with respect to the display DoF range), it is expected to adjust the display image distance of the first object to a depth position with a relatively small depth value (for example, it is expected that the image point $p_2$, which has the image distance $d_{p2}$ when the point is displayed by the non-tilted first display unit and the first lenslet, forms an image at an image distance $d_{p2}"$ by means of the tilted first display unit and the first lenslet, and $d_{p2} > d_{p2}"$), and in this case, it may be determined that the tilt direction of the first display unit is a first direction, wherein the first direction is a direction of increasing an angle between the plane in which the first display unit is located and the plane in which the lenslet array is located (that is, the plane in which the non-tilted first lenslet is located). The first display unit is tilted towards the first direction with respect to the original plane of the display array by the expected tilt angle, and in this way, the convergence condition of the average circle of confusion can be satisfied as quickly as possible in the tilt control process of the first display unit, thereby improving the tilt control efficiency of the first display unit. For another example, if the depth distribution sub-region of the first object is located at a relatively shallow position with respect to the display DoF range, it is expected to adjust the display image distance of the first object to a depth position with a relatively large depth value, and in this case, it may be determined that the tilt direction of the first display unit is a second direction, wherein the second direction is a direction of decreasing an angle between the plane in which the first display unit is located and the plane in which the lenslet array is located (that is, the plane in which the non-tilted first lenslet is located). The first display unit is tilted towards the second direction with respect to the original plane of the display array by the expected tilt angle, and in this way, the convergence condition of the average circle of confusion can be satisfied as quickly as possible in the tilt control process of the first display unit, thereby improving the tilt control efficiency of the first display unit.

Alternatively, optionally, the tilting the first display unit with respect to the original plane of the display array according to the display DoF range and the depth distribution sub-region comprises: determining expected display depth information of the first object according to the display DoF range and the depth distribution sub-region; determining a permissible tilt angle range of the first display unit according to at least the expected display depth information; and tilting the first display unit with respect to the original plane of the display array according to at least the permissible tilt angle range. By means of this solution, the first display unit is tilted with respect to the original plane of the display array, and an angle between the tilted first display unit and the original plane of the display array (for example, an angle between the plane in which the tilted first display unit is located and the plane in which the original plane of the display array is located) falls in the permissible angle range. The permissible angle range may be flexibly determined according to a requirement that the tilted display unit can reduce an average circle of confusion in imaging of a corresponding object, which is not limited in the embodiment of the present application. This solution improves the tilt control efficiency of the first display unit, and can improve the clearness of the first object displayed by the tilted first display unit and the first lenslet corresponding to the first display unit.

The permissible angle range may be predetermined according to the requirement that the tilted display unit can reduce the corresponding average circle of confusion, and a determining method may comprise but not limited to: determining by means of experiment, determining by means of analog simulation, determining by means of formula derivation, and the like. Optionally, the determining a permissible tilt angle range of the first display unit according to at least the expected display depth information comprises: determining an expected tilt angle of the first display unit according to at least a focal length of the first lenslet and the expected display depth information; and determining a permissible angle range according to at least the expected tilt angle. For a method for determining the expected tilt angle, refer to the description above. After the expected tilt angle is determined, with reference to factors such as a tilt adjustment precision limitation of the display unit and a display quality requirement on an object, an angle range of the expected tilt angle within a certain permissible error range is used as the permissible angle range. The permissible angle range determined by using this solution is relatively reasonable, and tilt control of the display unit performed based on the permissible angle range is efficient and easy to implement.

In an actual application, the tilt of the first display unit with respect to the original plane of the display array may be controlled according to the permissible angle range, so that the tilt angle of the first display unit with respect to the original plane of the display array falls in the permissible angle range.

Alternatively, a tilt direction of the first display unit may be determined according to a relative distribution of the depth distribution sub-region and the display DoF range in the depth direction; and the first display unit is tilted with respect to the original plane of the display array according to the tilt direction and the permissible tilt angle range. For a method for determining the tilt direction of the first display unit, refer to the description above. By means of this solution, the tilt control efficiency of the first display unit can be improved, so that tilt control on the first display unit satisfies a convergence condition of the average circle of confusion as quickly as possible.

With reference to any technical solution provided by the embodiments of the present application, the method for determining the expected display depth information is very flexible, and is not limited in the embodiments of the present application.

Optionally, the determining expected display depth information of the first object according to at least the display DoF range comprises: determining any display depth in the display DoF range as the expected display depth information of the first object. For example, the display DoF range of the light field display device is $[V_{close},V_{far}]$, and a display depth in the display DoF range may be determined as the expected display depth information of the first object, that is, expected display depth information $\nabla' \in [V_{close}, V_{far}]$ of each point in the first object. In an actual application, a preferable display depth in the display DoF range may be determined as the expected display depth information of the first object according to one or more factors such as a focal length adjustment capability of the first lenslet and a relative distribution of objects in different depth distribution sub-regions of the content, and the expected display depth information is used as a basis for tilt control of the first lenslet, thereby improving the flexibility of solution implementation.

Optionally, the determining expected display depth information of the first object according to at least the display DoF range comprises: determining a display depth, which is in the display DoF range and close to the depth distribution sub-region, as the expected display depth information of the first object according to a relative distribution of the depth distribution sub-region and the display DoF range in the depth direction. The term "close to" is a relative concept taking a permissible range into consideration, and in an actual application, the expected display depth information may be determined with reference to a depth position $V_{focus}$ of a current display focus plane of the light field display device. For example, if the depth distribution sub-region corresponding to the first object is located at a relatively deep area with respect to the display DoF range, a display depth in the range of $[V_{focus}, V_{far}]$ (for example, a depth position as close to $V_{far}$ as possible in the range of $[V_{focus}, V_{far}]$) may be determined as the expected display depth information of the first object; if the depth distribution sub-region corresponding to the first object is located at a relatively shallow area with respect to the display DoF range, a display depth in the range of $[V_{focus}, V_{far}]$ (for example, a depth position as close to $V_{close}$ as possible in the range of $[V_{focus}, V_{far}]$) may be determined as the expected display depth information of the first object. By means of such processing, a relative relationship of display depths between objects, of the content, distributed at different depths can be kept unchanged as far as possible. An object having a greater depth has a greater display image distance than an object having a smaller depth, so that the sense of depth when the user watches the image is not reduced while the clearness of the image is improved, thereby improving user experience.

Optionally, before the tilting the first display unit with respect to the original plane of the display array according to the display DoF range and the depth distribution sub-region, the method further comprises: determining a display unit, which is in the display array and affects display of the first object, as the first display unit. By means of this solution, one or more display units, which are in the display array of the light field display device and affect display of the first object, may be determined as the first display units, and then tilt control is performed on the one or more first display units, to change the display image distance of the first object displayed by the corresponding first display unit, so that the display image distance falls in the display DoF range of the light field display device, thereby improving the display quality of the first object.

Figure 2C:
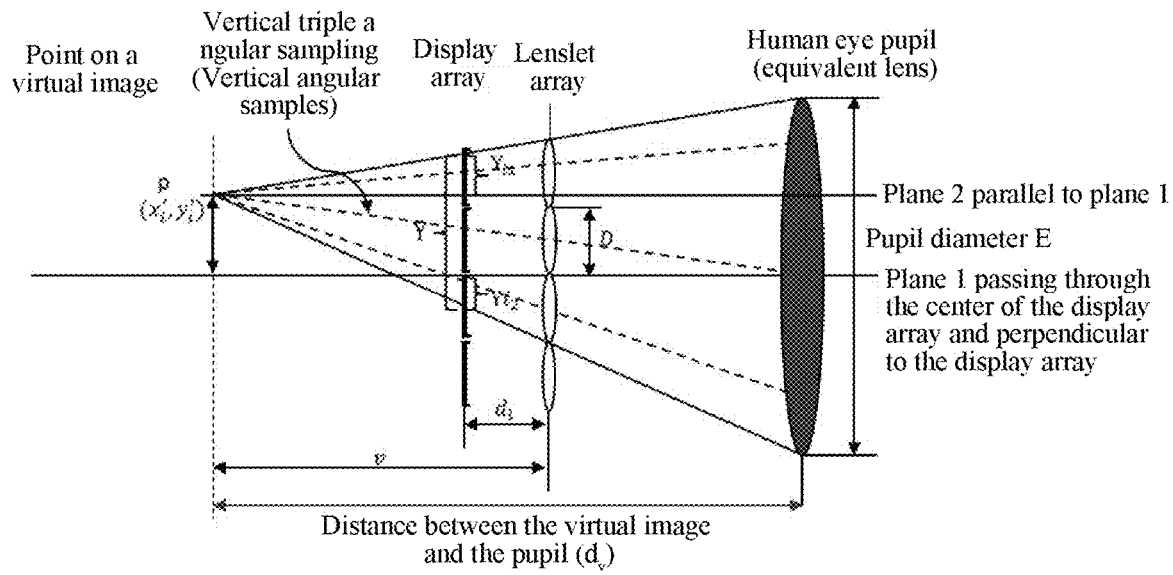
FIG. 2c illustrates an example of determining a first lenslet according to an embodiment of the present application.

Further optionally, the determining a display unit, which is in the display array and affects display of the first object, as the first display unit comprises: determining the first display unit according to the expected display depth information, the focusing distance for viewing, and a pupil size of a human eye. In some cases of light field display, content displayed on the display array and a virtual image that a user sees through a lenslet array are the same in terms of content but have different image expression forms. The virtual image that the user sees through the lenslet array is usually consistent with an image seen by a human eye in a natural environment, while the display array displays multiple sub-images, wherein each display unit displays one sub-image, each sub-image corresponds to a part of the virtual image, and objects represented by different sub-images may be partially the same. For example, light field display is performed by using triple angular samples (that is, 3×3 display units are used to represent display information of a same object from different angles). For example, a same object such as a beak may be shown in 9 sub-images, display units that display the 9 sub-images may be determined as first display unit to be adjusted, and tilt control is performed on the first display units to improve the image clearness of the object. For example, referring to FIG. 2c, determining a first display unit that affects display of a point of the first object is used as an example to describe a method for determining the first display unit:

(a2) Assuming that the content is a clear 2D image (wherein after light field display, the 2D image is displayed as a 3D image having a particular display depth distribution in space), image coordinates $\{(x_i,y_i)\}$, in the 2D image, of points in the first object in a partial depth distribution sub-region of the 2D image may be determined according to depth distribution information of the 2D image. It should be noted that, the determined image coordinates of the points may be in a concentrated distribution or in a dispersed distribution. A point in the first object is used as an example for description.

(b2) According to the determined image coordinates of the point, space coordinates $p(x'_i,y'_i)$ of a virtual image point P corresponding to the point are determined, wherein $x'_i=M_1 x_i, y'_i=M_2 y_i$, M is a known scaling coefficient, for example, M1 is a known X-direction scaling coefficient and M2 is a known Y-direction scaling coefficient.

(c2) The virtual image point P may be regarded as a virtual light source. Entering of a light ray emitted by the virtual light source into a human eye is related to a distance between the virtual light source and the human eye and the pupil size of the human eye, while the distance between the virtual light source and the human eye is equivalent to a display depth of the virtual image point P, and a diameter of the pupil of the human eye can be acquired in advance according to an empirical value, an experiment value, or a detected value. After the two pieces of information are determined, a light cone with the virtual image point P as a vertex is also determined correspondingly, and light rays in the light cone can enter the human eye. Therefore, light rays emitted by display units covered by a cross section between the display array and the light cone may be regarded as light rays capable of entering the human eye, and these display units are display units that affect display of the virtual image point, namely, the first display units. Optionally, a coverage area of the virtual image point P on the display array along a vertical direction may be determined according to formulas (3) and (4), thereby determining the first display unit according to the coverage area:

$$y_{min} = -Y_{i2} = \frac{(v-d_l)(0.5E - y_i')}{d_v} + y_i' - \frac{(v-d_l)E}{d_v} \quad (3)$$

$$y_{max} = y_i' + Y_{i1} = \frac{(v-d_l)(0.5E - y_i')}{d_v} + y_i' \quad (4)$$

wherein:

$$\frac{Y}{E} = \frac{v-d_l}{d_v} \quad (5)$$

$$\frac{Y_{i1}}{0.5E - y_i'} = \frac{v-d_l}{d_v} \quad (6)$$

$$Y_{i2} = Y - Y_{i1} - y_i' \quad (7)$$

In the foregoing formulas: Y represents a vertical coverage area of a cross section, in a plane where the display array is located, of a light cone from the virtual image point P, which is used as a virtual light source, to the pupil of the human eye; $Y_{i1}$ represents a vertical distance from an upper boundary of the cross section between the light cone and the display array to a plane 2, $Y_{i2}$ represents a vertical distance from a lower boundary of the cross section between the light cone and the display array to a plane 1, wherein the plane 1 passes through the center of the display array and is perpendicular to the plane of the display array, and the plane 2 is a plane that passes through the virtual image point P and is parallel to the plane 1; $y_{min}$ represents a minimum coordinate value of a vertical coverage area of the virtual image point P on the display array; $y_{max}$ represents a maximum coordinate value of the vertical coverage area of the virtual image point P on the display array; $d_l$ represents a distance between the display array and the lenslet array; $d_v$ represents a distance between the virtual image and the lenslet array; and E represents the diameter of the pupil.

(d2) Display units corresponding to the coverage area may be determined according to the coverage area and vertical (Y-axis) coordinate position information of each display unit in the display array.

(e2) Likewise, by using a method similar to (c2) and (d2), display units corresponding to a coverage area may be determined according to the coverage area and horizontal (X-axis) coordinate position information of each display unit in the display array.

For a coverage area determined in a particular direction (for example, the vertical direction or the horizontal direction), if the coverage area completely overlaps with vertical position coordinates of display units, the display units, which are covered by the coverage area, at the coordinates in the corresponding direction (the vertical direction or the horizontal direction) can be conveniently determined as the first display units; if an edge part of the coverage area does not completely correspond to a complete display unit, the first display unit may be determined by using an approximate processing method, for example, a display unit partially covered by the coverage area is determined as the first display unit, or only a display unit completely covered by the coverage area is the first display unit, or a display unit whose coordinate overlapping sub-area with the coverage area satisfies a particular ratio is the first display unit. The determining manner is very flexible.

(II) In another optional implementation manner, the first display unit may be tilted with respect to the original plane of the display array and the first lenslet may be tilted with respect to the original plane of the lenslet array according to the display DoF range and the depth distribution sub-region, so as to adjust the display image distance of the first object displayed by the first display unit and the first lenslet, thereby improving display quality of the first object.

Optionally, the tilting the first display unit with respect to the original plane of the display array and tilting a first lenslet with respect to an original plane of a lenslet array according to the display DoF range of the light field display device and the depth distribution sub-region comprises: determining expected display depth information of the first object according to the display DoF range and the depth distribution sub-region; determining a first tilt angle of the first display unit and a second tilt angle of the first lenslet according to a focal length of the first lenslet, the expected display depth information, and a distance between the display array and the lenslet array; tilting the first display unit with respect to the original plane of the display array according to the first tilt angle, and tilting the first lenslet with respect to the original plane of the lenslet array according to the second tilt angle, so as to adjust the display image distance of the first object displayed by the first display unit and the first lenslet, thereby improving display quality of the first object. For determining of the expected display depth information, refer to the description above, and details are not described herein again.

Figure 4:
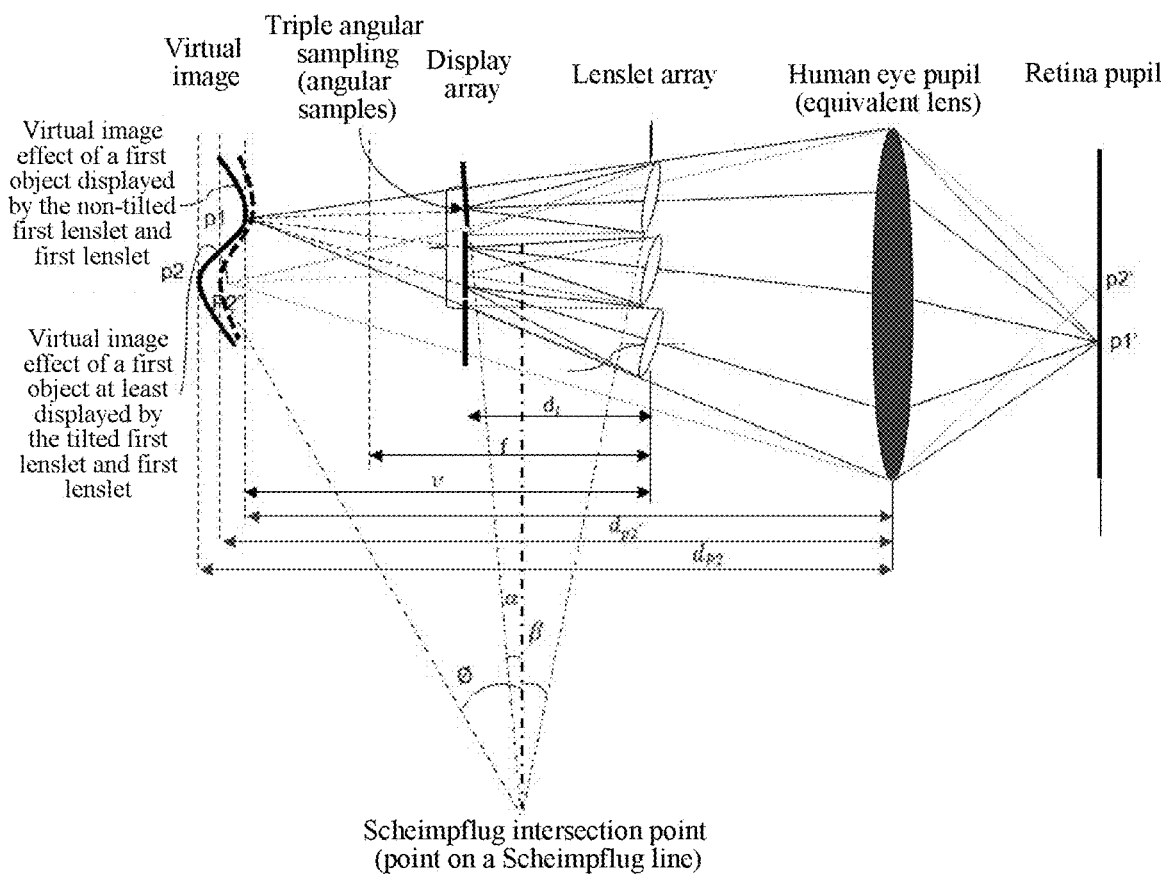
FIG. 4 illustrates a third example of a light field display device and light field display thereof according to an embodiment of the present application.

In light field display, after the first display unit and the first lenslet are tilted, the plane in which the first display unit is located may be no longer parallel to the plane in which the first lenslet is located. With reference to the Scheimpflug principle, when an extended plane of a plane where an image, which is formed by means of the first display unit and the first lenslet corresponding to the first display unit, of the first object in the depth distribution sub-region is located (that is, the object display plane), an extended plane of a plane in which the tilted first lenslet is located, and an extended plane of a plane in which the first display unit is located intersect at a straight line, as shown in FIG. 4, the first object in the depth distribution sub-region can obtain a maximum clear imaging area. A tilt angle of the first display unit satisfying the foregoing principle is the first tilt angle in the embodiment of the present application, and a tilt angle of the first lenslet satisfying the foregoing principle is the second tilt angle in the embodiment of the present application. Optionally, the first tilt angle and the second tilt angle may be determined according to the following formula:

$$\tan\phi = \frac{u}{f}\tan\alpha + \frac{u}{v}\tan\beta \quad (8)$$

α represents a first tilt angle of the first display unit; β represents a second tilt angle of the first lenslet; f represents a focal length of the first lenslet; Ø represents an angle between the object display plane and the original plane of the display array (or the plane in which the first display unit is located before being tilted); v represents a distance from an optical center of the first lenslet to the first display unit along the original plane of the lenslet array; for example, the optical center of the first lenslet remains unchanged before and after the first lenslet is tilted, and a center of the first display unit remains unchanged before and after the first display unit is tilted; in this case, a distance between the optical center of the first lenslet and the center of the first display unit is the distance from the optical center of the first lenslet to the first display unit along the original plane of the lenslet array; u represents a distance from the optical center of the first lenslet to the object display plane along a direction perpendicular to the original plane of the lenslet array (or the plane in which the first lenslet is located before being tilted), that is, a distance $d_l$ from the original plane of the lenslet array to the original plane of the display array, as shown in the figure. The first display unit and the first lenslet are respectively tilted according to the first tilt angle and the second tilt angle determined in this solution, which improves tilt control efficiency of the first display unit and the first lenslet, and the first object displayed by the tilted first display unit and the tilted first lenslet can obtain a relatively large clear imaging area. Besides, the tilt control efficiency may also be improved with reference to the tilt direction. By using FIG. 4 as an example, if virtual image points before and after adjustment are $P_2$ and $P_2''$ respectively, and display distances corresponding to $P_2$ and $P_2''$ satisfy that $d_{p2}>d_{p2}''$, the first lenslet and the first display unit are tilted along a direction of increasing the angle between the first lenslet and the original plane of the lenslet array and increasing the angle between the first display unit and the original plane of the display array; otherwise, the first lenslet and the first display unit may be tilted along a direction of decreasing the angle between the first lenslet and the original plane of the lenslet array and decreasing the angle between the first display unit and the original plane of the display array. By means this solution, the tilt of the first display unit and the tilt of the first lenslet can satisfy the convergence condition as quickly as possible, thereby improving the tilt control efficiency.

Further optionally, before the tilting the first display unit with respect to the original plane of the display array according to the first tilt angle, and tilting the first lenslet with respect to the original plane of the lenslet array according to the second tilt angle, the method further comprises: determining a display unit, which is in the display array and affects display of the first object, as the first display unit, and determining a lenslet, which is in the lenslet array and affects display of the first object, as the first lenslet. By means of this solution, one or more display units, which are in the display array of the light field display device and affect display of the first object, may be determined as the first display unit, the first lenslet corresponding to the first display unit is determined in the lenslet array, and tilt control is performed on the determined first display unit and the determined first lenslet, to change the display image distance of the first object displayed by the first display unit and the first lenslet, so that the display image distance falls in the display DoF range of the light field display device, thereby improving the display quality of the first object.

Further optionally, the determining a display unit, which is in the display array and affects display of the first object, as the first display unit, and determining a lenslet, which is in the lenslet array and affects display of the first object, as the first lenslet comprises: determining the first display unit according to the expected display depth information, the focusing distance for viewing, and a pupil size of a human eye; and determining a lenslet, which is in the lenslet array and corresponds to the first display unit, as the first lenslet according to a correspondence between display units in the display array and lenslets in the lenslet array. For a specific method for determining the first display unit, refer to the description above. After the first display unit is determined, a lenslet which is in the in the lenslet array and corresponds to the first display unit may be determined as the first lenslet according to a mapping relationship between display units in the display array and lenslets in the lenslet array of the light field display device. In this solution, the method for determining the first display unit and first lenslet that affect display of the first object in the depth distribution sub-region is simple and easy to implement.

A person skilled in the art should understand that, in any of the foregoing methods in the specific implementation manners of the present application, sequence numbers of the steps do not mean a corresponding execution order. The corresponding execution order of the steps should be determined according to functions and internal logic thereof, and should not be construed as any limitation on implementation processes of the specific implementation manners of the present application.

Figure 5:
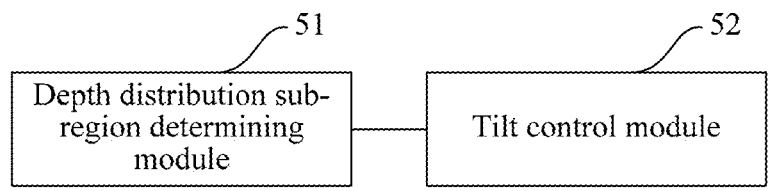
FIG. 5 is a logic block diagram of a first light field display control apparatus according to an embodiment of the present application.

FIG. 5 is a logic block diagram of a first light field display control apparatus according to an embodiment of the present application. As shown in FIG. 5, the light field display control apparatus provided in the embodiment of the present application may comprise: a depth distribution sub-region determining module 51 and a tilt control module 52.

The depth distribution sub-region determining module 51 is configured to determine at least one depth distribution sub-region of content according to a display DoF range of a light field display device and depth distribution information of the content, wherein each depth distribution sub-region of the at least one depth distribution sub-region is located outside the display DoF range.

The tilt control module 52 is configured to tilt a first display unit at least with respect to an original plane of a display array of the light field display device according to the display DoF range of the light field display device and the depth distribution sub-region, wherein the first display unit is a display unit that is in the display array and affects display of a first object, and the first object is a part, which is located in the depth distribution sub-region, of the content.

In the technical solution provided by the embodiment of the present application, the first display unit is tilted at least with respect to the original plane of the display array according to a current display DoF range of the light field display device and a depth distribution sub-region on which image quality control needs to be performed, to change a display image distance of the first object in space at least by means of control over the tilt of the first display unit, so that an average display image distance of a virtual image which is formed after the first object is displayed by the first lenslet is distributed in the display DoF range of the light field display device as far as possible, thereby improving display quality of the first object displayed by the first display unit that at least has been tilted. In this solution, on the basis of clear imaging in an original display DoF range, a control means of at least tilting a display unit is fully utilized to improve display quality of an object in at least one depth distribution sub-region outside the display DoF range, achieving an effect equivalent to that a user can clearly see an object which is in a depth range larger than the original display DoF range; moreover, in the display quality adjustment process, it is unnecessary to perform complex computation on source content of a light field, and by adjusting a focal length of a corresponding lenslet, display quality of an object outside the original display DoF range can be adjusted. The solution is simple and easy to control. Besides, in the present application, on the basis of an existing display pixel resource of the light field display device, a technical means is provided to clearly display, in a partial depth distribution sub-region, an object which otherwise would not be clearly displayed in some cases limited by the display pixel resource. The solution is simple and easy to control.

The light field display control apparatus may execute the light field display control method in application programs that comprise but not limited to: image presentation, video playback, and the like, to perform image display control. A device manifestation form of the light field display control apparatus is not limited. For example, the light field display control apparatus may be an independent component, and the component is in coordination and communication with a light field display device; or the light field display control apparatus may be integrated in a light field display device as a functional module, and the light field display device may comprise but not limited to: an electronic device having a light field display capability. For example, the light field display device may comprise but not limited to: a near-to-eye light field display device, and the near-to-eye light field display device may comprise but not limited to: a smart helmet, smart glasses, and the like.

Optionally, an average circle of confusion, in a first display plane of the light field display device, of the first object displayed by the first display unit that at least has been tilted is less than or equal to a permissible circle of confusion, wherein the first display plane is a display plane that is corresponding to a focusing distance for viewing in a depth direction and perpendicular to the depth direction. In this solution, reduction of the average circle of confusion in the first display plane can be used as a convergence condition for tilt control on a tilt component (for example, the first display unit or the first display unit and the first lenslet), thereby improving the efficiency and pertinence of the tilt control on the tilt component.

Optionally, at least one of the at least one depth distribution sub-region is continuous in terms of depth with the display DoF range. This solution helps improve display quality of an object, which is on the periphery of the display DoF range, in the content being displayed or the content to be displayed. In terms of a viewing effect of the user, this is equivalent to that the user can clearly see an object in a depth range larger than the original display DoF range.

Optionally, at least one of the at least one depth distribution sub-region is discontinuous in terms of depth with the display DoF range. This solution helps improve display quality of an object, which is outside the display DoF range, in the content being displayed or the content to be displayed. In terms of a viewing effect of the user, this is equivalent to that the user can clearly see an object in a depth range larger than the original display DoF range.

Figure 6:
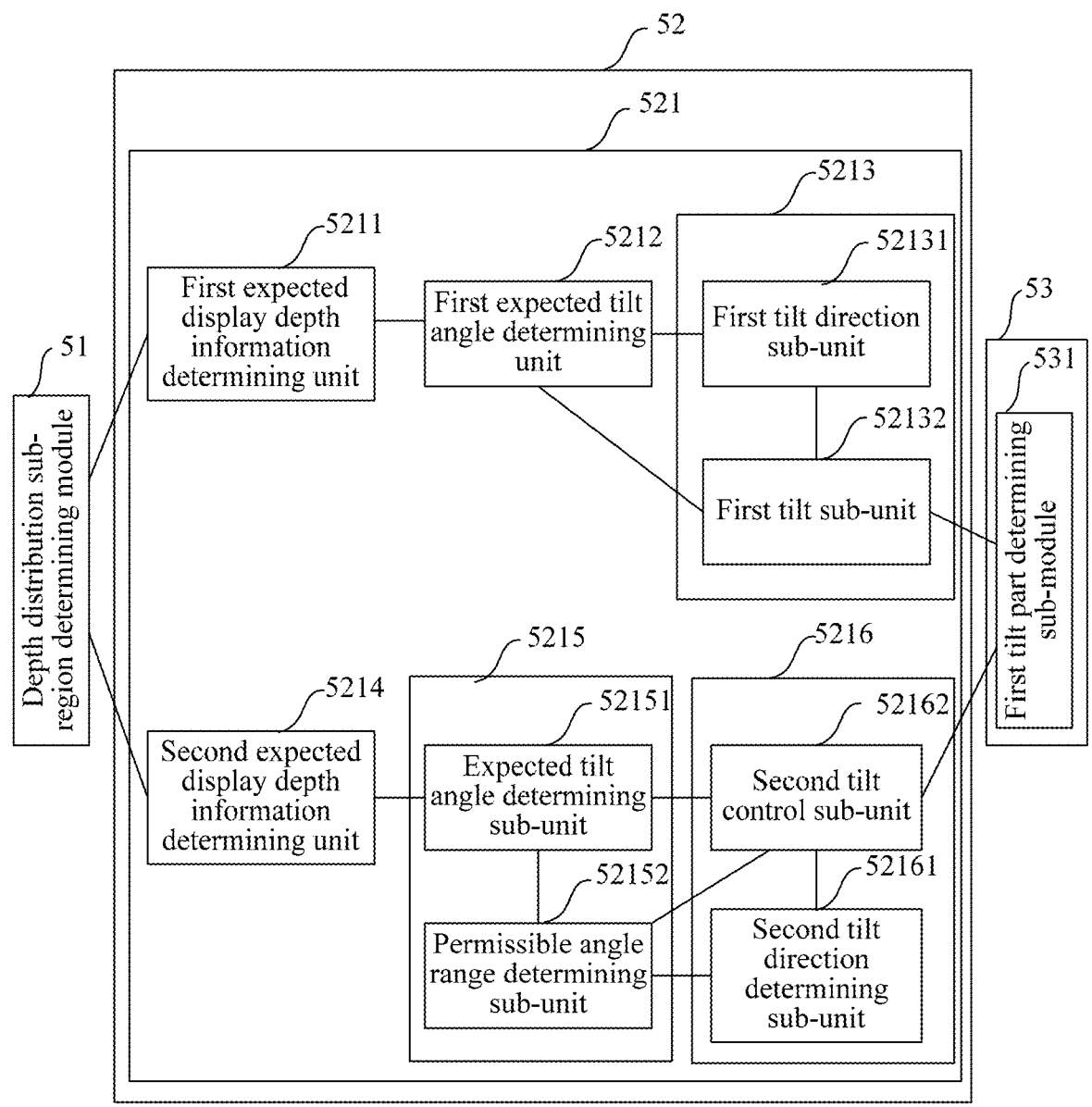
FIG. 6 is a logic block diagram of a second light field display control apparatus according to an embodiment of the present application.

In an optional implementation manner, as shown in FIG. 6, the tilt control module 52 comprises: a first tilt control sub-module 521. The first tilt control sub-module 521 is configured to tilt the first display unit with respect to the original plane of the display array according to the display DoF range and the depth distribution sub-region. In this solution, the first display unit is tilted, so as to adjust a display image distance of the first object displayed by the first display unit, thereby improving the display quality of the first object.

Further optionally, the first tilt control sub-module 521 comprises: a first expected display depth information determining unit 5211, a first expected tilt angle determining unit 5212, and a first tilt unit 5213. The first expected display depth information determining unit 5211 is configured to determine expected display depth information of the first object according to the display DoF range and the depth distribution sub-region; the first expected tilt angle determining unit 5212 is configured to determine an expected tilt angle of the first display unit according to at least a focal length of the first lenslet and the expected display depth information; the first tilt unit 5213 is configured to tilt the first display unit with respect to the original plane of the display array according to at least the expected tilt angle. For a method for determining, by the first expected display depth information determining unit, the expected display depth information of the first object, refer to the description in the method embodiment above, and details are not described herein again. This solution improves tilt control efficiency of the first display unit, and the first object displayed by the tilted first display unit and the first lenslet corresponding to the first display unit can obtain a relatively large clear imaging area.

Optionally, the first tilt unit 5213 comprises: a first tilt direction sub-unit 52131 and a first tilt sub-unit 52132. The first tilt direction sub-unit 52131 is configured to determine a tilt direction of the first display unit according to a relative distribution of the depth distribution sub-region and the display DoF range in the depth direction; the first tilt sub-unit 52132 is configured to tilt the first display unit with respect to the original plane of the display array according to the tilt direction and the expected tilt angle. By means this solution, the convergence condition of the average circle of confusion can be satisfied as quickly as possible in the tilt control process of the first display unit, thereby improving the tilt control efficiency.

Optionally, the first tilt control sub-module 521 comprises: a second expected display depth information determining unit 5214, a permissible tilt angle range determining unit 5215, and a second tilt control unit 5216. The second expected display depth information determining unit 5214 is configured to determine expected display depth information of the first object according to the display DoF range and the depth distribution sub-region; the permissible tilt angle range determining unit 5215 is configured to determine a permissible tilt angle range of the first display unit according to at least the expected display depth information; the second tilt control unit 5216 is configured to tilt the first display unit with respect to the original plane of the display array according to at least the permissible tilt angle range. For a method for determining, by the second expected display depth information determining unit, the expected display depth information of the first object, refer to the description in the foregoing method embodiment, and details are not described herein again. This solution improves the tilt control efficiency of the first display unit, and can improve the clearness of the first object displayed by the tilted first display unit and the first lenslet corresponding to the first display unit.

Optionally, the permissible tilt angle range determining unit 5215 comprises: an expected tilt angle determining sub-unit 52151 and a permissible angle range determining sub-unit 52152. The expected tilt angle determining sub-unit 52151 is configured to determine an expected tilt angle of the first display unit according to at least a focal length of the first lenslet and the expected display depth information; the permissible angle range determining sub-unit 52152 is configured to determine a permissible angle range according to at least the expected tilt angle. The permissible angle range determined by using this solution is relatively reasonable, and tilt control of the display unit performed based on the permissible angle range is efficient and easy to implement.

Optionally, the second tilt control unit 5216 comprises: a second tilt direction determining sub-unit 52161 and a second tilt control sub-unit 52162. The second tilt direction determining sub-unit 52161 is configured to determine a tilt direction of the first display unit according to a relative distribution of the depth distribution sub-region and the display DoF range in the depth direction; the second tilt control sub-unit 52162 is configured to tilt the first display unit with respect to the original plane of the display array according to the tilt direction and the permissible tilt angle range. By means of this solution, the tilt control efficiency of the first display unit can be improved, so that tilt control on the first display unit satisfies the convergence condition of the average circle of confusion as quickly as possible.

Optionally, the apparatus further comprises: a first tilt part determining module 53. The first tilt part determining module 53 is configured to determine a display unit, which is in the display array and affects display of the first object, as the first display unit. By means of this solution, one or more display units, which are in the display array of the light field display device and affect display of the first object, may be determined as the first display units, and then tilt control is performed on the one or more first display units, to change the display image distance of the first object displayed by the first display unit, so that the display image distance falls in the display DoF range of the light field display device, thereby improving the display quality of the first object.

Further optionally, the first tilt part determining module 53 comprises: a first tilt part determining sub-module 531. The first tilt part determining sub-module 531 is configured to determine the first display unit according to the expected display depth information, the focusing distance for viewing, and a pupil size of a human eye. This solution of determining the first display unit is simple and easy to implement.

Figure 7:
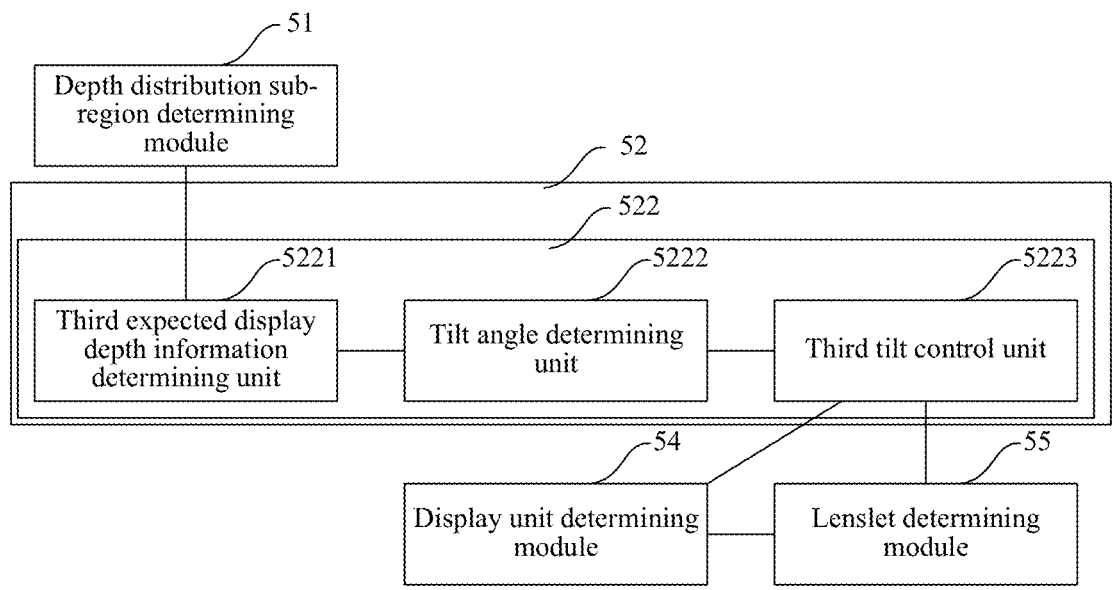
FIG. 7 is a logic block diagram of a third light field display control apparatus according to an embodiment of the present application.

In another optional implementation manner, as shown in FIG. 7, the tilt control module 52 comprises: a second tilt control sub-module 522. The second tilt control sub-module 522 is configured to tilt the first display unit with respect to the original plane of the display array and tilt a first lenslet with respect to an original plane of a lenslet array according to the display DoF range of the light field display device and the depth distribution sub-region, wherein the first lenslet is a lenslet that is in the light field display device and affects display of the first object. In this solution, the first display unit and the first lenslet corresponding to the first display unit are tilted, so as to adjust a display image distance of the first object displayed by the first display unit and the first lenslet, thereby improving the display quality of the first object. By means of this solution, the tilt control efficiency of the first display unit can be improved, so that tilt control on the first display unit satisfies the convergence condition of the average circle of confusion as quickly as possible.

Optionally, the second tilt control sub-module 522 comprises: a third expected display depth information determining unit 5221, a tilt angle determining unit 5222, and a third tilt control unit 5223. The third expected display depth information determining unit 5221 is configured to determine expected display depth information of the first object according to the display DoF range and the depth distribution sub-region; the tilt angle determining unit 5222 is configured to determine a first tilt angle of the first display unit and a second tilt angle of the first lenslet according to a focal length of the first lenslet, the expected display depth information, and a distance between the display array and the lenslet array; the third tilt control unit 5223 is configured to tilt the first display unit with respect to the original plane of the display array according to the first tilt angle, and tilt the first lenslet with respect to the original plane of the lenslet array according to the second tilt angle. For a method for determining, by the third expected display depth information determining unit, the expected display depth information of the first object, refer to the description of the foregoing method embodiment, and details are not described herein again. By means of this solution, one or more display units, which are in the display array of the light field display device and affect display of the first object, may be determined as the first display units, the first lenslet corresponding to the first display unit is determined in the lenslet array, and then tilt control is performed on the determined first display unit and the determined first lenslet, to change the display image distance of the first object displayed by the first display unit and the first lenslet, so that the display image distance falls in the display DoF range of the light field display device, thereby improving the display quality of the first object.

Further optionally, the apparatus further comprises: a display unit determining module 54 and a lenslet determining module 55. The display unit determining module 54 is configured to determine the first display unit according to the expected display depth information, the focusing distance for viewing, and a pupil size of a human eye; the lenslet determining module 55 is configured to determine a lenslet, which is in the lenslet array and corresponds to the first display unit, as the first lenslet according to a correspondence between display units in the display array and lenslets in the lenslet array. In this solution, the method for determining the first display unit and first lenslet that affect display of the first object in the depth distribution sub-region is simple and easy to implement.

Figure 8:
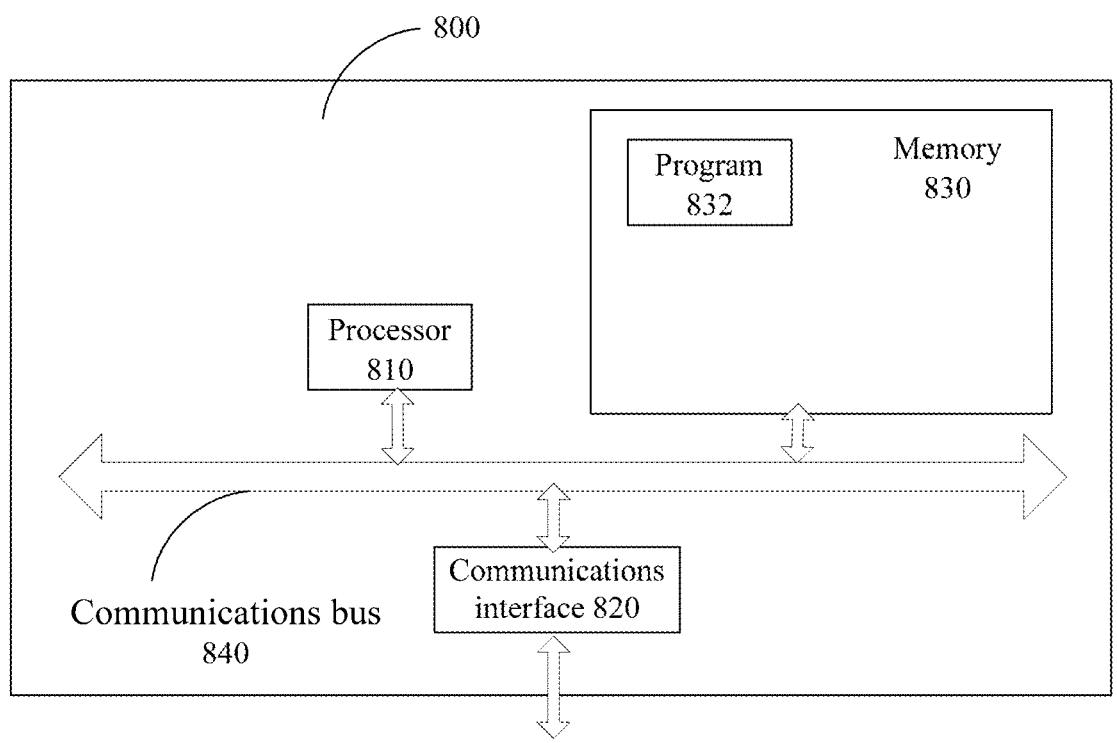
FIG. 8 is a logic block diagram of a fourth light field display control apparatus according to an embodiment of the present application.

FIG. 8 is a structural block diagram of a fourth light field display control apparatus according to an embodiment of the present application. The specific embodiment of the present application does not limit a specific implementation manner of the light field display control apparatus 800. As shown in FIG. 8, the light field display control apparatus 800 may comprise:

a processor 810, a communications interface 820, a memory 830, and a communications bus 840.

The processor 810, the communications interface 820 and the memory 830 communicate with each other by using the communications bus 840.

The communications interface 820 is configured to communicate with a device having a communications function, an external light source, and the like.

The processor 810 is configured to execute a program 832, and specifically may execute related steps in any one of the foregoing embodiments of the light field display control method.

For example, the program 832 may comprise program code, and the program code comprises a computer operation instruction.

The processor 810 may be a central processing unit (CPU), or an application specific integrated circuit (ASIC), or is configured to be one or more integrated circuits for implementing the present application.

The memory 830 is configured to store the program 832. The memory 830 may comprise a random access memory (RAM), or may further comprise a non-volatile memory, for example, at least one magnetic disk memory.

For example, in an optional implementation manner, the processor 810 may execute the following steps by executing the program 832: determining a partial depth distribution sub-region of content according to at least depth distribution information of the content; and tilting a first display unit at least with respect to an original plane of a display array of the light field display device according to the display DoF range of the light field display device and the depth distribution sub-region, wherein the first display unit is a display unit that is in the display array and affects display of a first object, and the first object is a part, which is located in the depth distribution sub-region, of the content.

In another optional implementation manner, the processor 810 may further execute steps mentioned in any other embodiment above by executing the program 832, and details are not described herein again.

For specific implementation of the steps in the program 832, refer to corresponding descriptions in the corresponding steps, modules, sub-modules, and units in the foregoing embodiments, and details are not described herein again. It may be clearly understood by a person skilled in the art that, for the purpose of convenient and brief description, for a specific working process of the foregoing system, apparatus, and unit, reference may be made to a corresponding process in the foregoing method embodiments, and details are not described herein again.

Figure 9:
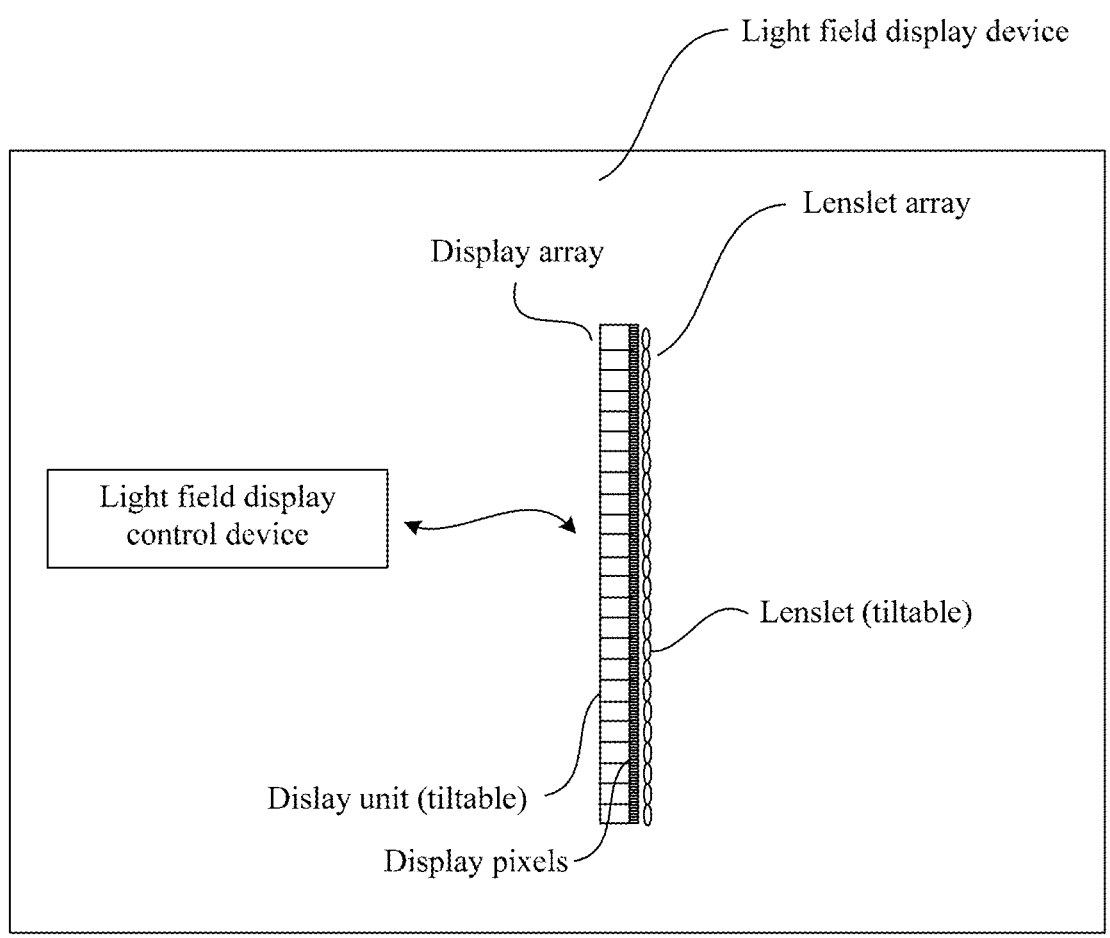
FIG. 9 is a schematic structural diagram of a light field display device according to an embodiment of the present application.

An embodiment of the present application further provides a light field display device. As shown in FIG. 9, the light field display device comprises: a display array, a lenslet array, and a light field display control apparatus; the display array comprises multiple display units that are distributed in the array and are capable of tilting with respect to an original plane of the display array; the lenslet array comprises multiple lenslets distributed in the array; the display array and the lenslet array are arranged close to each other (that is, a distance between the display array and the lenslet array is very small, and is usually less than a maximum focal length of the lenslets in the lenslet array); the light field display control apparatus is connected to the display array and the lenslet array, and perform tilt control on one or more display units to improve partial display clearness.

Further optionally, the multiple lenslets in the lenslet array are capable of tilting with respect to an original plane of the lenslet array, and the light field display control apparatus is connected to the display array and the lenslet array, and performs tilt control on the one or more display units and one or more lenslets corresponding to the one or more display units, so as to improve partial display clearness.

The light field display control apparatus may be any light field display control apparatus provided in the embodiments of the present application, and can execute, in application processes that comprise but not limited to: image presentation, video playback, and the like, any light field display control method provided in the embodiments of the present application, to perform image display control. For a principle and an apparatus structure for the light field display control performed by the light field display device, refer to the description in other embodiments of the present application, and details are not described herein again.

In the embodiments of the present application, the serial numbers and/or corresponding order of the embodiments is merely used for description, and is not intended to represent merits of the embodiments. The descriptions on the embodiments have their respective emphasis, and for a part that is not described in detail in a certain embodiment, reference may be made to related description in another embodiment. For related descriptions of implementation principles or processes related to the apparatus, device or system embodiments, reference may be made to the records of the corresponding method embodiments, which are not repeated herein.

A person of ordinary skill in the art should appreciate that, in combination with the examples described in the embodiments herein, units and method steps can be implemented by electronic hardware, or a combination of computer software and electronic hardware. Whether the functions are executed by hardware or software depends on specific applications and design constraint conditions of the technical solutions. A person skilled in the art can use different methods to implement the described functions for every specific application, but it should not be considered that this implementation goes beyond the scope of the present application.

When being implemented in the form of a software functional unit and sold or used as a separate product, the functions may be stored in a computer-readable storage medium. Based on such understanding, the technical solutions of the present invention essentially, or the part contributing to the prior art, or part of the technical solutions may be implemented in a form of a software product. The computer software product is stored in a storage medium, and comprises several instructions for instructing a computer device (which may be a personal computer, a server, a network device, or the like) to execute all or part of the steps of the method described in each of the embodiments of the present application. The aforementioned storage medium comprises: any medium that can store program codes, such as a USB disk, a removable hard disk, a read-only memory (ROM), a random access memory (RAM), a magnetic disk, or an optical disc.

In the embodiments of the apparatus, method and system of the present application, apparently, each component (such as the system, sub-system, module, sub-module, unit, and sub-unit) or each step may be decomposed, combined and/or combined after being decomposed. The decomposition and/or re-combination should be considered as an equivalent solution of the present application. Meanwhile, in the description of the specific embodiments of the present application, a feature described and/or shown for one implementation manner may be used in one or more other implementation manners in an identical or similar way, may be combined with a feature in another implementation manner, or may replace a feature in another implementation manner.

It should be emphasized that the term "comprise/contain" used in this text to indicate existence of a feature, element, step or component, and does not exclude existence or addition of one or more other features, elements, steps or components.

Finally, it should be noted that: the aforementioned description of the implementation manners are merely provided for describing the present application, but not intended to limit the present application. A person of ordinary skill in the art can also make many variations and changes without departing from the spirit and the scope of the present application. Therefore, all the equivalent technical solutions also fall within the scope of the present application, and the patent protection scope of the present application shall be limited by the claims.

What is claimed is:

1. A light field display control method, comprising:
   determining at least one depth distribution sub-region of content according to a display depth of field (DoF) range of a light field display device and depth distribution information of the content, wherein each depth distribution sub-region of the at least one depth distribution sub-region is located outside the display DoF range;
   determining expected display depth information of a first object according to the display DoF range and the at least one depth distribution sub-region;
   determining a permissible tilt angle range of a first display unit according to at least the expected display depth information; and
   tilting the first display unit with respect to an original plane of a display array according to at least the permissible tilt angle range, such that an average circle of confusion in a first display plane of the light field display device of the first object displayed by the tilted first display unit is less than or equal to a permissible circle of confusion, wherein the first display unit is a display unit that is in the display array and affects display of the first object, the first object is a part, which is located in the at least one depth distribution sub-region of the content, and the first display plane is a display plane that is corresponding to a focusing distance for viewing in a depth direction and perpendicular to the depth direction.

2. The method of claim 1, wherein at least one of the at least one depth distribution sub-region is continuous in terms of depth with the display DoF range.

3. The method of claim 1, wherein at least one of the at least one depth distribution sub-region is discontinuous in terms of depth with the display DoF range.

4. The method of claim 1, further comprising:
   determining an expected tilt angle of the first display unit according to at least a focal length of a first lenslet and the expected display depth information; and
   tilting the first display unit with respect to the original plane of the display array according to at least the expected tilt angle.

5. The method of claim 4, wherein the tilting the first display unit with respect to the original plane of the display array according to at least the expected tilt angle comprises:
   determining a tilt direction of the first display unit according to a relative distribution of the at least one depth distribution sub-region and the display DoF range in the depth direction; and
   tilting the first display unit with respect to the original plane of the display array according to the tilt direction and the expected tilt angle.

6. The method of claim 1, wherein the determining a permissible tilt angle range of a first display unit according to at least the expected display depth information comprises:
   determining an expected tilt angle of the first display unit according to at least a focal length of a first lenslet and the expected display depth information; and
   determining a permissible angle range according to at least the expected tilt angle.

7. The method of claim 1, wherein the tilting the first display unit with respect to an original plane of a display array according to at least the permissible tilt angle range comprises:
   determining a tilt direction of the first display unit according to a relative distribution of the at least one depth distribution sub-region and the display DoF range in the depth direction; and
   tilting the first display unit with respect to the original plane of the display array according to the tilt direction and the permissible tilt angle range.

8. The method of claim 1, wherein before the tilting the first display unit with respect to the original plane of the display array according to at least the permissible tilt angle range, the method further comprises:
   determining the display unit, which is in the display array and affects display of the first object, as the first display unit.

9. The method of claim 8, wherein the determining the display unit, which is in the display array and affects display of the first object, as the first display unit comprises:
   determining the first display unit according to the expected display depth information, the focusing distance for viewing, and a pupil size of a human eye.

10. The method of claim 1, wherein the tilting the first display unit with respect to an original plane of a display array according to at least the permissible tilt angle range comprises:
    tilting the first display unit with respect to the original plane of the display array and tilting a first lenslet with respect to an original plane of a lenslet array according to at least the permissible tilt angle range, wherein the first lenslet is a lenslet that is in the light field display device and affects display of the first object.

11. The method of claim 10, wherein the tilting the first display unit with respect to the original plane of the display array and tilting a first lenslet with respect to an original plane of a lenslet array according to at least the permissible tilt angle range comprises:
    determining a first tilt angle of the first display unit and a second tilt angle of the first lenslet according to a focal length of the first lenslet, the expected display depth information, and a distance between the display array and the lenslet array; and
    tilting the first display unit with respect to the original plane of the display array according to the first tilt angle, and tilting the first lenslet with respect to the original plane of the lenslet array according to the second tilt angle.

12. The method of claim 11, wherein before the tilting the first display unit with respect to the original plane of the display array according to the first tilt angle, and tilting the first lenslet with respect to the original plane of the lenslet array according to the second tilt angle, the method further comprises:
    determining the display unit, which is in the display array and affects display of the first object, as the first display unit, and determining a lenslet, which is in the lenslet array and affects display of the first object, as the first lenslet.

13. The method of claim 12, wherein the determining the display unit, which is in the display array and affects display of the first object, as the first display unit, and determining a lenslet, which is in the lenslet array and affects display of the first object, as the first lenslet comprises:
    determining the first display unit according to the expected display depth information, the focusing distance for viewing, and a pupil size of a human eye; and
    determining a lenslet, which is in the lenslet array and corresponds to the first display unit, as the first lenslet according to a correspondence between display units in the display array and lenslets in the lenslet array.

14. The method of claim 1, wherein the determining expected display depth information of a first object according to the display DoF range and the at least one depth distribution sub-region comprises:
   determining a display depth in the display DoF range as the expected display depth information of the first object according to the display DoF range and the at least one depth distribution sub-region.

15. The method of claim 14, wherein the determining a display depth in the display DoF range as the expected display depth information of the first object according to the display DoF range and the at least one depth distribution sub-region comprises:
   determining a display depth, which is in the display DoF range and close to the at least one depth distribution sub-region, as the expected display depth information of the first object according to a relative distribution of the at least one depth distribution sub-region and the display DoF range in the depth direction.

16. A non-transitory computer-readable storage medium configured with instructions executable by one or more processors to cause the one or more processors to perform operations comprising:
   determining at least one depth distribution sub-region of content according to a display depth of field (DoF) range of a light field display device and depth distribution information of the content, wherein each depth distribution sub-region of the at least one depth distribution sub-region is located outside the display DoF range;
   determining expected display depth information of a first object according to the display DoF range and the at least one depth distribution sub-region;
   determining a permissible tilt angle range of a first display unit according to at least the expected display depth information; and
   tilting the first display unit with respect to an original plane of a display array according to at least the permissible tilt angle range, such that an average circle of confusion in a first display plane of the light field display device of the first object displayed by the tilted first display unit is less than or equal to a permissible circle of confusion, wherein the first display unit is a display unit that is in the display array and affects display of the first object, the first object is a part, which is located in the at least one depth distribution sub-region of the content, and the first display plane is a display plane that is corresponding to a focusing distance for viewing in a depth direction and perpendicular to the depth direction.

17. A light field display control apparatus, comprising: a processor, a communications interface, a memory, and a communications bus, wherein the processor, the communications interface, and the memory communicate with each other by means of the communications bus;
   the memory is configured to store at least one instruction, and the instruction causes the processor to perform operations including:
   determining at least one depth distribution sub-region of content according to a display depth of field (DoF) range of a light field display device and depth distribution information of the content, wherein each of the at least one depth distribution sub-region is located outside the display DoF range;
   determining expected display depth information of a first object according to the display DoF range and the at least one depth distribution sub-region;
   determining a permissible tilt angle range of a first display unit according to at least the expected display depth information; and
   tilting the first display unit with respect to an original plane of a display array according to at least the permissible tilt angle range, such that an average circle of confusion in a first display plane of the light field display device of the first object displayed by the tilted first display unit is less than or equal to a permissible circle of confusion, wherein the first display unit is a display unit that is in the display array and affects display of the first object, the first object is a part, which is located in the at least one depth distribution sub-region of the content, and the first display plane is a display plane that is corresponding to a focusing distance for viewing in a depth direction and perpendicular to the depth direction.

18. The apparatus of claim 17, wherein at least one of the at least one depth distribution sub-region is continuous in terms of depth with the display DoF range.

19. The apparatus of claim 17, wherein at least one of the at least one depth distribution sub-region is discontinuous in terms of depth with the display DoF range.

20. The apparatus of claim 17, wherein the operations further include:
   determining an expected tilt angle of the first display unit according to at least a focal length of a first lenslet and the expected display depth information; and
   tilting the first display unit with respect to the original plane of the display array according to at least the expected tilt angle.

21. The apparatus of claim 20, wherein the operations further include:
   determining a tilt direction of the first display unit according to a relative distribution of the at least one depth distribution sub-region and the display DoF range in the depth direction; and
   tilting the first display unit with respect to the original plane of the display array according to the tilt direction and the expected tilt angle.

22. The apparatus of claim 17, wherein the operations further include:
   determining an expected tilt angle of the first display unit according to at least a focal length of a first lenslet and the expected display depth information; and
   determining a permissible angle range according to at least the expected tilt angle.

23. The apparatus of claim 17, wherein the operations further include:
   determining a tilt direction of the first display unit according to a relative distribution of the depth at least one distribution sub-region and the display DoF range in the depth direction; and
   tilting the first display unit with respect to the original plane of the display array according to the tilt direction and the permissible tilt angle range.

24. The apparatus of claim 17, wherein the operations further include:
   determining the display unit, which is in the display array and affects display of the first object, as the first display unit.

25. The apparatus of claim 24, wherein the operations further include:
  determining the first display unit according to the expected display depth information, the focusing distance for viewing, and a pupil size of a human eye.

26. The apparatus of claim 17, wherein the operations further include:
  tilting the first display unit with respect to the original plane of the display array and tilting a first lenslet with respect to an original plane of a lenslet array according to at least the permissible tilt angle range, wherein the first lenslet is a lenslet that is in the light field display device and affects display of the first object.

27. The apparatus of claim 26, wherein the operations further include:
  determining a first tilt angle of the first display unit and a second tilt angle of the first lenslet according to a focal length of the first lenslet, the expected display depth information, and a distance between the display array and the lenslet array; and
  tilting the first display unit with respect to the original plane of the display array according to the first tilt angle, and tilting the first lenslet with respect to the original plane of the lenslet array according to the second tilt angle.

28. The apparatus of claim 26, wherein the operations further include:
  determining the first display unit according to the expected display depth information, the focusing distance for viewing, and a pupil size of a human eye; and
  determining a lenslet, which is in the lenslet array and corresponds to the first display unit, as the first lenslet according to a correspondence between display units in the display array and lenslets in the lenslet array.

29. A light field display device comprising the light field display control apparatus of any one of claims 17, wherein the light field display device further comprises:
  a display array, comprising multiple display units that are distributed in the array and are capable of tilting with respect to an original plane of the display array; and
  a lenslet array, comprising multiple lenslets distributed in the array,
  wherein the light field display control apparatus is connected to the display array and the lenslet array.

30. The device of claim 29, wherein the multiple lenslets are capable of tilting with respect to an original plane of the lenslet array.

* * * * *